United States Patent [19]
Levin et al.

[11] Patent Number: 5,432,934
[45] Date of Patent: Jul. 11, 1995

[54] ACCESS RESTRICTIONS AS A MEANS OF CONFIGURING A USER INTERFACE AND MAKING AN APPLICATION SECURE

[75] Inventors: Michael Levin; Benjamin A. Hyde, both of Arlington; Mark H. David, Brookline, all of Mass.

[73] Assignee: Gensym Corporation, Cambridge, Mass.

[21] Appl. No.: 97,405

[22] Filed: Jul. 26, 1993

[51] Int. Cl.[6] .............................................. G06F 12/14
[52] U.S. Cl. .............................. 395/650; 364/DIG. 1; 364/286.5
[58] Field of Search ........................ 395/650, 700, 725; 364/DIG. 1 MS File

[56] References Cited

U.S. PATENT DOCUMENTS

| | | | |
|---|---|---|---|
| 4,584,639 | 4/1986 | Hardy | 364/DIG. 1 |
| 4,858,117 | 8/1989 | DiChiara et al. | 364/DIG. 1 |
| 5,136,712 | 8/1992 | Perazzoli, Jr. et al. | 395/700 |
| 5,239,648 | 8/1993 | Nukui | 364/DIG. 1 |
| 5,265,221 | 11/1993 | Miller | 395/725 |
| 5,321,841 | 6/1994 | East et al. | 395/725 |

Primary Examiner—Thomas M. Heckler
Attorney, Agent, or Firm—Pandiscio & Pandiscio

[57] ABSTRACT

An access restriction interface system for use in a computer system of the sort comprising an operating environment and an application program and user interface apparatus, wherein the access restriction system is adapted to limit user access to the computer system by restricting user input through the user interface apparatus and computer output through the user interface apparatus. Preferably the access restriction system comprises a workspace hierarchy characterized by at least one top-level workspace and at least one lower level workspace on which items may be positioned; at least one class hierarchy for items and attributes of items positioned in one or more of the workspaces, the class hierarchy being characterized by a base class and one or more lower level classes; user restrictions selectively assignable to one or more of the workspaces and implemented in the workspace hierarchy; and class restrictions selectively assignable to one or more of the classes and implemented in the class hierarchy.

15 Claims, 13 Drawing Sheets

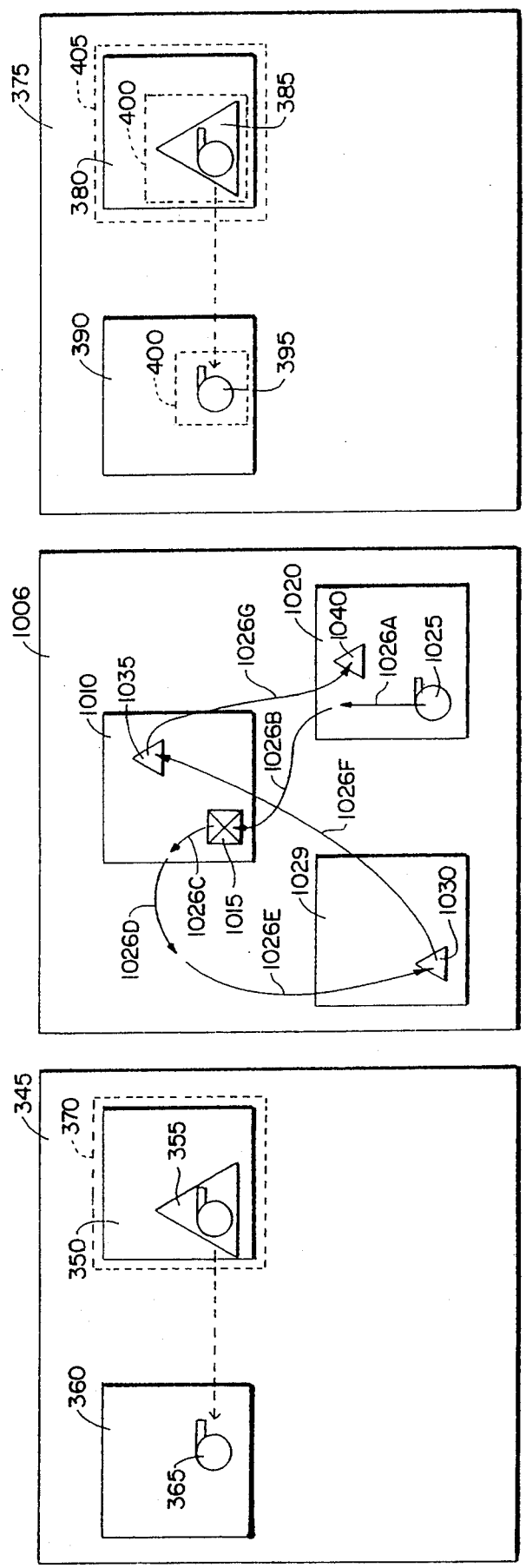

ACCESS RESTRICTIONS AS A MEANS OF CONFIGURING A USER INTERFACE AND MAKING AN APPLICATION SECURE

FIELD OF THE INVENTION

This invention relates to computer systems in general, and more particularly to user interfaces for the same.

BACKGROUND OF THE INVENTION

1. User Interfaces

User interfaces for computer systems are well known in the art. In general, such user interfaces serve as the means through which users interact with the computer systems.

More particularly, in the usual case, the user interface comprises a screen display through which the computer system presents the user with computer output. Such output may serve to present the user with the opportunity to enter commands, to prompt the user to input data, to display data to the user, etc. The user interacts with the computer system by entering commands and/or data through the user interface, using various input devices such as a keyboard, mouse, etc. The specific manner in which the user interface functions generally defines the way in which the user can interact with the computer system.

In single user computer systems, the user interface is generally identical for all users once the system has been initially configured. However, in multi-user computer systems, it is common for the user interface to be specially configured for each different class or category of computer user. Such an arrangement is generally quite useful for two different reasons. First, by presenting each different class or category of user with thier own unique user interface, the computer system's utility can be enhanced for each different type of user. Second, by specially configuring the user interface for each different class of user, access to the system can be controlled according to user type. Generally, the highest class of user (typically referred to as the system "administrator") is given unlimited access to the system, while the other classes or categories of users are given more restricted levels of access to the system.

For example, in the case of a multi-user process control system, it would be common for the system administrator to have full access to the computer system. Therefore, the user interface for the administrator would typically provide the administrator with access to all of the command choices and all of the system data for the process control system. The user interface for the administrator might also provide the administrator with access to some or all of the computer system's underlying program code as well. However, in such a process control system, a lower level user (e.g. a maintenance engineer) might typically have access to only some of the features of the system. For example, the maintenance engineer might be able to view selected information on the status of a system component (e.g. the state of a valve), but might not be able to issue a command to change the state of that component (e.g. to open or close the valve). Therefore, the user interface for the maintenance engineer would typically be customized so as to provide that user with only the desired level of access to the system.

In the vast majority of prior art multi-user computer systems, the user interface must generally be custom built for each different type of user having access to the system. More particularly, in most prior art multi-user systems, each different application program must generally include a special block of code to create the unique user interface for each different type of user. These blocks of interface code form an integral part of each application program and provide the means by which the different users can interact with the system. Thus, the special blocks of interface code can to some extent be considered "enabling", in the sense that they must be specially created for each different type of user in order to permit that user to interact with the computer system.

See, for example, FIG. 1, which shows a typical prior art multi-user computer system comprising an operating environment, an application program, and a plurality of "enabling" user interfaces. It will be appreciated that with such a multi-user computer system, where the user interface is based on an "additive" approach, the special block of code provided to handle the user interface for the lowest level user will generally be the least complex, while the special block of code provided to handle the user interface for the highest level user (i.e., the administrator) will generally be the most complex.

Unfortunately, while the foregoing architecture does permit the user interface to be customized for each different type of user, it also requires a very substantial amount of time and effort to build the unique user interface needed for each different type of user.

A radically different approach is used in G2 ® Ver. 2.11B, a prior art multi-user real-time expert system created by Gensym Corporation of Cambridge, Mass. More particularly, in G2 Ver. 2.11B, the operating environment and the application program are arranged so that the user interface for each different user type is initially fully enabled for that user type. G2 Ver. 2.11B provides means, in the form of an access restriction system, to disable selected interface features for each different type of user. By selectively disabling interface features on a "personalized" basis, the desired unique user interface can be provided for each different type of user. Thus, the G2 Ver. 2.11B access restriction system can to some extent be considered "disabling", in the sense that access restrictions are used to selectively withdraw user access according to user type.

See, for example, FIG. 2, which shows a typical G2 Ver. 2.11B computer system comprising an operating environment, an application program, and a plurality of "disabling" access restriction interfaces. It will be appreciated that with such a computer system, where the user interface is based on a "subtractive" approach, the access restriction system for the highest level user (i.e., the administrator) will generally be the least complex, while the access restriction system for the lowest level user will generally be the most complex.

More complete details on the G2 Ver 2.11B access restriction system will now be provided.

2. Introduction to the G2 Ver. 2.11B Access Restriction System

The G2 Ver. 2.11B access restriction system has two basic purposes: first, to configure the behavior of the user interface; and second, to control the ability of different users (having differing access privileges) to view and modify information, initiate activities, and modify the behavior of a G2 Ver. 2.11B application.

Some specific examples of this might be as follows:
  causing a button when pushed to execute a specific activity which could be either internal to G2 Ver.

2.11B (e.g. causing a display to appear) or external to G2 Ver. 2.11B (e.g. causing a valve to open);

making this button inoperative when pushed by some users;

allowing some users to see certain displays of information on workspaces, and keeping them off-limits for other users;

allowing some users to view certain attributes of an object as shown in a table, and preventing other users from viewing the same attributes;

allowing some users to view and modify certain attributes of an object as shown in a table, and other users to view but not to modify them;

allowing some users to modify a schematic presented on a workspace, and other users only to view the schematic, where the modifications may include adding new icons, deleting existing icons, moving the icons around on the schematic, making or breaking connections between icons, changing the orientation of icons, and changing the colors of icons and connections;

allowing some users to create, modify and delete programmatic and behavioral aspects of a G2 Ver. 2.11B application (such as rules, formulas, procedures, and class definitions) while preventing other users from doing any of these things.

The G2 Ver. 2.11B access restriction system can be used to achieve any of the foregoing in a uniform way over a large application. At the same time, however, the G2 Ver. 2.11B access restriction system can also be applied in great detail to small portions of an application. Thus, it is capable of making local exceptions to global access restrictions.

A complete understanding of the G2 Ver. 2.11B access restriction system requires a broader understanding of the organization, components and basic interactions of G2 Ver. 2.11B. Accordingly, these will be reviewed next.

3. Important Concepts in G2 Ver. 2.11B 3.1 The Workspace Hierarchy.

The workspace hierarchy refers to the organizational layout or geography of a G2 Ver. 2.11B application. It can be viewed as a hypertext having the form of a forest, as will hereinafter be discussed in further detail.

In one form, a workspace is a rectangular bordered area upon which other items may be positioned. The items that appear on a workspace are visually of three types: icons, connections and messages. Icons are images having a fixed design. This design is governed by the class of the item that the icon represents. Connections are linear (stretchable) pathways extending between icons. They vary in thickness and in cross-sectional pattern. Messages are textual displays which are confined to a rectangular region.

See, for example, FIG. 3. FIG. 3 shows a G2 Ver. 2.11B screen display 5 which comprises a first workspace 10 and a second workspace 15. Various icons 20, connections 25 and messages 30 are shown on workspaces 10 and 15.

Some icons may have workspaces associated with them. This is called the subworkspace of the icon. This is a logical association, and should not be confused with the workspace that the icon appears on. For example, there may be a button on a workspace and when that button is pushed, it may cause another workspace which is the subworkspace of the button to be displayed.

See, for example, FIG. 4. FIG. 4 shows a G2 Ver. 2.11B screen display 40 which comprises workspaces 45, 50, 55, 60 and 65, wherein workspace 50 has two icons 70 and 75 thereon, and workspaces 60 and 65 constitute the subworkspaces of icons 70 and 75, respectively. It should be noted that FIG. 4 is to some extent conceptual in nature, since in G2 Ver. 2.11B workspaces and the subworkspaces of icons placed on those workspaces are not normally simultaneously displayed on the same screen.

A workspace that is not a subworkspace of any icon is called a top-level workspace. A top-level workspace may have icons on it which have subworkspaces associated with them. These subworkspaces may in turn may have other icons upon them which have further subworkspaces associated with these other icons. In this way workspaces may be seen to branch out from one another. A branching structure of this type having a single root is generally called a tree. The root of the tree is the top-level workspace that is the starting point to reach everything below it.

See, for example, FIG. 5, which shows a simple tree structure for a G2 Ver. 2.11B application. More particularly, FIG. 5 shows a G2 Ver. 2.11B screen display 80 which comprises three top-level workspaces 85, 90 and 95. Top-level workspace 85 has no icons placed thereon. Top-level workspace 90 has an icon 100 placed thereon, and a workspace 105 is the subworkspace of this icon 100. Workspace 105 in turn has three icons 110, 115 and 120 placed thereon, and workspaces 125, 130 and 135 are the subworkspaces of these three icons, respectively, Top-level workspace 95 has two icons 140 and 145 placed thereon, and workspaces 150 and 155 are the subworkspaces of these two icons, respectively. Again, it should be noted that FIG. 5 is to some extent conceptual in nature, since in G2 Ver. 2.11B workspaces and the subworkspaces of icons placed on those workspaces are not normally simultaneously displayed on the same screen.

In G2 Ver. 2.11B, an item may be an attribute of another item. The item which is an attribute of another item also belongs on this tree, just below the item that it is an attribute of. A G2 Ver. 2.11B application may have more than one top-level workspace, which is why it is sometimes convenient to consider workspaces in the context of a forest. In G2 Ver. 2.11B, the structure of the forest is called the workspace hierarchy. It is important to understand that the relationship among the different workspaces is a logical one, and that most of this structure is not visually apparent to the user at any given time. An application may have many workspaces, and only a small number of these can typically be shown at the same time in a G2 Ver. 2.11B window on the screen of a monitor.

The importance of the workspace hierarchy is that it provides an orderly and logical way to organize all the different parts of a G2 Ver. 2.11B application. The workspace hierarchy can be built with as much depth as is needed to serve its many purposes. For example, one part of the workspace hierarchy may contain programmatic material that most end users never see. This may be organized into several subsections for the different functional parts of the application. Each of these might be further subdivided so that there are places for class definitions, for rules, for procedures, etc. Another part of the workspace hierarchy might contain schematics for the end user. For example, there might be a single processing plant schematic, with detailed schematics of parts of the plant positioned on subworkspaces of the top level schematic. This might extend downward for several levels. Other workspaces might be used for displays, graphs, dialogs, etc.

This concept of workspace hierarchy is essential to the G2 Ver. 2.11B access restriction system. In particular, and as described in detail below, access restrictions (known as user restrictions) are implemented in G2 Ver. 2.11B by means of the workspace hierarchy. These user restrictions are essentially rules written according to a predetermined convention which govern the various characteristics of the user interface. A given user restriction applies to the specific workspace in which it is placed, and to all of the workspaces located below that workspace. Thus, the effect of a user restriction depends upon precisely where it is placed in the workspace hierarchy. If it is placed on a top-level workspace, it will apply to everything in the entire tree below that workspace. If it is placed further down the workspace hierarchy, it applies to a smaller region geographically. Since some user restrictions can be used to make exceptions to other user restrictions, it becomes easy to assert some behavior globally, and to retract it for one specific portion of the application.

3.2 The Class Hierarchy

G2 Ver. 2.11B can be used to implement applications that use the object oriented design paradigm. One of the important principles of such object oriented design is that of inheritance of important properties by means of a class hierarchy.

In G2 Ver. 2.11B, all items belong to classes. Some classes are built into G2 Ver. 2.11B as predefined classes, and some classes are user defined. Whenever a class is defined, it must be given a superior class, unless it is the basic class item. As a consequence, all classes form a tree which is called the class hierarchy. See, for example, FIG. 6, which shows a simple, illustrative class hierarchy relating to valves.

When a person refers to the class of an item, they generally mean the most specific class that the item is a member of. But an item is also a member of all of its superior classes. Thus, for example, if a G2 Ver. 2.11B item is a two-door-coupe, it may also be a passenger-car, a motor-vehicle, a manufactured-product, an object and an item. It simultaneously belongs to all of these classes by way of inheritance.

In G2 Ver. 2.11B, as in other object oriented definitional systems, attributes of objects are inherited by subclasses. For example, if horsepower is an attribute of the "higher" class motor-vehicle, then it will also be an attribute of the "lower" class two-door-coupe. In G2 Ver. 2.11B, the specification that motor-vehicle has an attribute called horsepower is placed in an item called the object-definition for the class motor-vehicle. Inheritance into subclasses is automatic in G2 Ver. 2.11B.

It should be appreciated that the class hierarchy is a very different type of hierarchy from the workspace hierarchy. Both types of hierarchy are present in G2 Ver. 2.11B, but each one relates to something quite different.

More particularly, the class hierarchy is a classification system, as is the hierarchy called taxonomy in natural science. (Chimpanzee is a subclass of primate. Primate is a subclass of mammal, etc.) A subclass is always a more restrictive and specific class of its superior class. Items belong to thier immediate class and to all superior classes.

The workspace hierarchy, on the other hand, has nothing to do with classification. It is an organizational system for subdividing a whole into parts and subparts. It is geographic in nature. It is like saying that Nebraska is part of the United States, and Lincoln is part of Nebraska. Or again, it is like saying that a house has rooms, and rooms have windows and doors. In G2 Ver. 2.11B, one could have a schematic for the house on a workspace, and show a more detailed schematic for each room on a subworkspace. A room is part of a house. It is not a particular kind of a house.

In G2 Ver. 2.11B, user restrictions can be placed on workspaces and flow through the workspace hierarchy. User restrictions can also be placed on class definitions which are located within a given workspace. However, in G2 Ver. 2.11B, user restrictions which are placed on class definitions which are located within a given workspace do not flow outside that workspace through the class hierarchy; they can only flow outside that workspace, to the subworkspace (if any) of that class definition, through the workspace hierarchy.

3.3 Basics of the G2 Ver. 2.11B User Interface

In G2 Ver. 2.11B, access restrictions work by removing or modifying some of the interactive user interface behavior of the system. Thus it will be seen that, in order to properly understand the G2 Ver. 2.11B access restriction system, one must first understand how the basic G2 Ver. 2.11B user interface works. To that end, there now follows a simple description of the G2 Ver. 2.11B user interface, in the absence of any access restrictions.

In G2 Ver. 2.11B, the user interface is based largely upon menus. There is no menu bar in G2 Ver. 2.11B; instead, menus are created on the fly whenever there is a mouse click on the G2 Ver. 2.11B window.

For example, if the mouse is clicked on the G2 Ver. 2.11B window background or border where there is no workspace, then the Main Menu for G2 Ver. 2.11B is displayed. The Main Menu offers certain global choices such as Start. It also has several sub-menus which can logically be considered as part of the Main Menu. See, for example, FIG. 7, which shows a G2 Ver. 2.11B screen display 160 which comprises three workspaces 165, 170 and 175, a mouse pointer 180 which is located on the G2 Ver. 2.11B window background, and a Main Menu 185 which has been generated by clicking the mouse while mouse pointer 180 is located on the G2 Ver. 2.11B window background or border where there is no workspace.

If, on the other hand, the click is on a workspace but not on any item upon that workspace, then the workspace menu for that workspace is displayed. See, for example, FIG. 8, which shows a G2 Ver. 2.11B screen display 190 which comprises two workspaces 195 and 200 having icons 205, 210 and 215 thereon, as shown, a mouse pointer 220 which is located on workspace 195, and a workspace menu 225 which has been generated by clicking the mouse while mouse pointer 220 is located on workspace 195 but not on either of the items 205, 210.

If the click is on any item upon a workspace, then the menu for that item is displayed. This applies to icons, connections, and messages. See, for example, FIG. 9, which shows a G2 Ver. 2.11B screen display 230 which comprises two workspaces 235 and 240 having icons 245, 250 and 255 thereon, as shown, a mouse pointer 260 which is located on icon 250, and an item menu 265 for item 250 which has been generated by clicking the mouse while mouse pointer 260 is located on icon 250.

With the exception of the Main Menu and its submenus, every menu belongs to some item.

The menu for an item is the gateway to most ways of interacting with that item. Every item has built-in menu choices, as well as user defined ones. Some of the important item menu choices are:
- change-size
- clone
- color
- create-subworkspace
- delete
- edit
- move
- name
- rotate-reflect
- table
- transfer Some other menu choices that appear only in workspace menus are:
- new-object
- new-rule
- new-display
- new-free-text
- new-button
- hide-workspace
- delete-workspace Some menu choices lead to further menu choices. For example, selecting new-object leads to a further choice.

The things that one can do to an item other than to get its menu are called non-menu choices. The most important of these non-menu choices are:
- move the item if it has an icon or text region by dragging it with the mouse;
- move a workspace by dragging it with the mouse;
- extend connections, make corners in them, and connect them to other icons;
- open a text region for editing or typing (this is how a user types into a field in a dialog).

Denying the user access to either menu choices or non-menu choices will prevent most forms of interaction, including, for example, the creation and deletion of items. This concept of denying the user access to either menu choices or non-menu choices is the essence behind the G2 Ver. 2.11B access restriction system, as will be discussed in further detail below.

It is important to appreciate that every item in G2 Ver. 2.11B has an attribute table. This table has rows, one for each attribute, and two columns, the cells of the left column for the name of the attribute and those of the right column for the value of the attribute. See, for example, FIG. 10, which shows a G2 Ver. 2.11B screen display 270 which comprises two workspaces 275 and 280. Workspace 275 has an item 285 thereon. Also shown is a workspace 290 which is a subworkspace of item 285, and an attribute table 295 which lists the various attributes of item 285. FIG. 10 also shows an attribute table 310 which lists the various attributes of the object which is the value of the cell 315 shown in attribute table 295. Again, it should be noted that FIG. 10 is to some extent conceptual in nature, since in G2 Ver. 2.11B at least some of the items shown would not normally be simultaneously displayed on the same screen.

Except for some attributes which are read only, the user can normally modify the value of an attribute by opening up the value cell of the table for editing. This can be done either by clicking on the text already in the cell, or by getting the menu for the cell and selecting edit.

Much of the important information in G2 Ver. 2.11B resides in the attributes of various items. For example, the text attribute of rules, formulas, procedures and functions contains the actual code of the item. Most information about the class hierarchy is contained in various attributes of class definitions. Thus, the ability to view and edit the attributes of items is quite important in G2 Ver. 2.11B. Correspondingly, the use of access restrictions to constrain the user's ability to view and edit the attributes of items is also very important in G2 Ver. 2.11B.

More particularly, through the use of appropriate access restrictions, a user can be prevented from viewing the attribute table for an item if clicking on the item does not display a menu, or if the menu does not offer the menu choice table. But access restrictions offer a further level of control than that. Even if the user is allowed to view the table, the rows representing some attributes may be omitted from the table, or the rows representing some attributes may be present in the table but the user's ability to edit or otherwise modify them has been removed, thereby making them read only.

3.4 Telewindows, User Modes, and Workspaces

As noted above, G2 Ver. 2.11B is a multi-user product. In addition to the many different types of networking that G2 Ver. 2.11B is capable of, a single G2 Ver. 2.11B application can be accessed by multiple users at the same time by means of an interface to G2 Ver. 2.11B called Telewindows®. This Telewindows interface simultaneously allows each user to have a different view of the same G2 Ver. 2.11B application, but with each user having different user privileges.

Under the Telewindows interface, each user may be in a different location on a computer network running a Telewindows interface program as a client, with the single G2 Ver. 2.11B program as the server. See, for example, FIG. 11, which shows such an arrangement. When the client Telewindow node connects to the server G2 Ver. 2.11B application, there is a log-in dialogue. As part of this log-in dialogue, the user must provide his or her name, password, and user mode. If G2 Ver. 2.11B has been installed as a secure system, it will use the password to verify the user, and only permit user modes that have been authorized for that user by the system administrator. It is important to recognize that each window connected to a G2 Ver. 2.11B application, regardless of whether it is a local window or a Telewindow node window, has a user mode associated with it.

The concept of user mode is central to the G2 Ver. 2.11B access restriction system. More particularly, the G2 Ver. 2.11B access restriction system uses constructs called user restrictions to configure the user interface differently for each different type of user. These user restrictions are filtered (or activated) according to user mode. Thus, it is the use of these user restrictions, in combination with the user mode feature, which gives G2 Ver. 2.11B the ability to have a user interface that responds in different ways for different users.

The set of possible user modes is open ended. Only one user mode is pre-defined in G2 Ver. 2.11B, i.e., the administrator mode. Whenever a user interacts with G2 Ver. 2.11B from a window, the user mode of the window is an important determinant of how the interaction proceeds.

The presentation of workspaces in a window is specific to that window and is independent of whether and how the workspace is presented in any other window. A G2 Ver. 2.11B application which is serving multiple windows must track, independently for each window, which workspaces are exposed in the window, the scale and position of each exposed workspace, and the front-to-back ordering of the exposed workspaces. In all other respects, the appearance of a workspace is the same in all windows in which it appears. This includes what items are placed on the workspace and where they are placed, as well as thier orientation and colors. For example, if an icon on a workspace is moving, it will appear to be moving in any window in which the workspace (and the particular region of the workspace in which the motion occurs) is visible.

As will be discussed in further detail below, the user mode of a window has a strong influence on what the user sees and what happens when the user attempts to interact with what he or she sees.

4. The G2 Ver. 2.11B Access Restriction System

In G2 Ver. 2.11B, the access restriction system is implemented through constructs called user restrictions. In order to properly understand the use of user restrictions in G2 Ver. 2.11B, one must first understand what user restrictions do, where they are placed in G2 Ver. 2.11B, the order in which they are read, how they are filtered according to user mode, and how they combine with one another.

4.1 What User Restrictions Do

User restrictions work by modifying or eliminating portions of the user interface. These are as follows:

(a) Removing Menu Choices

Any choice offered on the Main Menu and its submenus, or on the menu for any item, may be removed. If all choices have been removed from a menu, the menu does not appear at all. Obviously, understanding the full power and use of this feature depends upon a strong familiarity with all the menu choices available on the various classes of items in G2 Ver. 2.11B.

An example of a user restriction clause removing a menu choice might be as follows:

menu choices for workspace exclude: new-object

User restrictions cannot make a menu choice appear on a menu that would not be there in the absence of restrictions. There is another feature of G2 Ver. 2.11B, the user-menu-choice item, which causes new menu choices to be added to menus, and specifies an action to be taken when that menu choice is selected by the user. User restrictions may remove these user-defined menu choices, as well as those that are built into G2 Ver. 2.11B.

If all menu choices have been removed, no menu appears upon clicking.

(b) Removing Non-Menu Choices

Any activity that can be performed on an item by means of the mouse or keyboard other than clicking to get its menu is called a non-menu choice. These non-menu choices include moving a workspace, scaling a workspace, moving an item on a workspace, dragging connections, and opening text regions for editing.

An example of a user restriction clause removing a non-menu choice might be as follows:

non-menu choices for furnace exclude: move-object

Removing such an option causes G2 Ver. 2.11B to be unresponsive to the particular keyboard or mouse activity.

(c) Selecting For Action

This user restriction feature changes what happens when the user clicks on an item. Instead of getting the menu for the item, the activity caused by making one particular choice from that menu is immediately invoked. The user restriction does not describe or specify an activity. It directs the user interface to proceed as if the menu had been displayed and the user had then selected a menu choice from the menu, but without actually displaying a menu or waiting for the user to make a choice.

An example of a user restriction clause selecting a menu choice for action might be as follows:

selecting any subworkspace-button implies go-to-subworkspace

This feature allows the G2 Ver. 2.11B user interface builder to create various buttons that cause specific things to happen. The specific menu choice which is selected for action can be either a built-in menu choice or a user-defined menu choice.

(d) Removing Attributes from an Attribute Table

This feature removes specified attributes from the attribute tables of specified classes.

Examples of user restriction clauses which remove attributes from an attribute table might be as follows:

attributes visible for procedure exclude: text or attributes visible for plant exclude: profit-margin The attribute being removed from an attribute table can be either built-in or user defined, as can be the class. This type of user restriction can be used to remove some types of user information from some users, but it can also be used to remove programmatic capability from some users, since important aspects of the G2 Ver. 2.11B programming language are found in built-in attributes of certain types of items.

(e) Modifying the Behavior of an Attribute Table

Table menu choices offer a wide range of control over the behavior and interactions of tables. For example, one can control the editing of attribute values so as to make them read only. This can be done either for all the attributes of a table, or for just some particular attributes.

Examples of user restriction clauses which modify the behavior of an attribute table might be:

table menu choices for control-panel exclude: edit or table menu choices for the price or discount of any merchandise exclude: edit 4.2 Where User Restrictions are Placed in G2 Ver. 2.11B User restrictions are placed in two different locations within G2 Ver. 2.11B. Thier scope depends on where they are placed. The syntax of the user restrictions is tailored somewhat according to thier specific location, although they tend to be quite similar to each other.

User restrictions may be placed in the user-restrictions attribute of every item. The scope of user restrictions placed in the user-restrictions attribute of an item is that portion of the workspace hierarchy of which that item is the root, i.e, they govern that item, and they are inherited from items to thier subworkspaces, from items to thier attributes which are items, and from workspaces to the items upon the workspace.

User restrictions may also be placed in the user-restrictions attribute of the kb-restrictions system table. This is a single global location in G2 Ver. 2.11B. The scope of user restrictions placed in the user-restrictions attribute of the kb-restrictions system table is global.

This is the only place in G2 Ver. 2.11B where it is possible to put menu restrictions on the Main Menu.

4.3 When and in What Order User Restrictions are Read

User restrictions become applicable when the user interacting with a window makes a gesture such that it is appropriate to display the Main Menu, display the menu of some item, otherwise manipulate some item, display a table, or interact with a table. In every case, there is a window from which the gesture is made, and in every case except for displaying the Main Menu, there is an item associated with the gesture.

Each location where user restrictions may be placed may contain a sequence of user restriction clauses. The order in which these user restriction clauses are read is very important. Some user restrictions may have a wide scope, and other user restrictions—which may or may not be intended as exceptions to the earlier ones—may have a much more local scope. For the purpose of reading and understanding user restrictions, it is sometimes useful to read them top down, because it is usually easier to understand a general rule and then deal with the exceptions later. But for the purpose of explaining exactly how user restrictions are implemented, it is better to read them bottom up, since this is how G2 Ver. 2.11B actually implements user restrictions. The reason for proceeding in this order is that once the exception is encountered, it is typically unnecessary to consult the general rule. Thus, in G2 Ver. 2.11B, the implementation of user restrictions causes them to be read from the bottom up.

The order in which user restrictions are read, using the bottom up convention, is as follows:

the user restrictions for the item that the gesture applies to are read, each clause being read from bottom to top, which is the reverse of the order in which they are displayed in a table;

continuing to traverse up the workspace hierarchy, that is, from workspace to the item that it is a subworkspace of, or from an item upon a workspace to the workspace, or from an attribute of an item to the item that it is an attribute of, until one arrives at a top-level workspace;

then reading the restrictions in the kb-restrictions system table from bottom to top.

The one exception to this is the Main Menu, where there is no item. Main menu user restrictions are found in the main-menu-user-restrictions attribute of kb-restrictions.

See FIG. 11A, which illustrates the order in which user restrictions are read in G2 Ver. 2.11B.

By way of further example, FIG. 11B shows a G2 Ver. 2.11B screen display 1005 that comprises a top-level workspace 1010, an item 1015 placed upon top-level workspace 1010, a workspace 1020 which is a subworkspace of item 1015, and an object 1025 which is placed upon workspace 1020. In the example of FIG. 11B, the user restrictions would be read in the order shown by following the arrows 1026A, 1026B, 1026C and 1026D, i.e., first one would read the user restrictions in the table for object 1025, then one would read the user restrictions in the table for subworkspace 1020, next one would read the user restrictions in the table for item 1015, then one would read the user restrictions in the table for workspace 1010, and finally one would read the user restrictions in the kb-restrictions table.

See also FIG. 11C, which shows a schematic flow chart illustrating the order in which the user restrictions would be read for the example shown in FIG. 11B.

FIG. 11D shows a related screen display 1005A for the same example, where top-level workspace 1010, item 1015, workspace 1020 and object 1025 are shown, as well as the attribute table 1025T for the object 1025, the attribute table 1020T for the workspace 1020, the attribute table 1015T for the item 1015, the attribute table 1010T for the workspace 1010, and the kb-restrictions table 1005T for the application running on screen displays 1005 and 1005A.

4.4 How User Restrictions are Filtered by User Mode

In G2 Ver. 2.11B, user restrictions are specified according to the following convention:

```
{none |
   when in <user mode or modes> mode :
      <restriction or restrictions> |
   unless in <user mode or modes> mode :
      <restriction or restrictions>}
```

Thus it will be seen that when reading user restrictions, groups of user restriction clauses are preceded by mode filters which are in the following form:

when in <mode or modes>: . . .

unless in <mode or modes>: . . .

These mode filters determine whether the restriction clauses following the mode filter are read or ignored. As the grammar suggests, if the clause begins with when, then the restriction clauses are read if the user mode of the window from which the gesture was made is one of the modes that follow. If the mode filter begins with unless, the restriction clauses are read if the user mode is not one of the modes that follow.

In G2 Ver. 2.11B, there is one built-in mode having special behavior. This is the administrator mode. User restrictions never apply in administrator mode, and one may not specify when in administrator mode . . . , although one may specify unless in administrator mode . . . The reason for this is that allowing the construct when in administrator mode . . . could permit the developer of an application to unintentionally lock himself or herself out of portions of the application program.

4.5 Combining Principles of User Restrictions

Recall that in G2 Ver. 2.11B, user restrictions are specified according to the following convention:

```
{none |
   when in <user mode or modes> mode :
      <restriction or restrictions> |
   unless in <user mode or modes> mode :
      <restriction or restrictions>}
```

In this convention, the specific user restriction clauses follow the mode filters discussed above.

G2 Ver. 2.11B provides five different kinds of user restriction clauses. They are specified according to the following conventions:

```
menu choices for <class or classes>
   {include [additionally] | exclude
      [additionally]}: <menu choices>
non-menu choices for <class or classes>
   {include [additionally] | exclude
      [additionally]}: <non-menu choices>
selecting any <class or classes> implies
   <menu choice>
```

-continued

```
attributes visible for <class or classes>
    {include [additionally] | exclude
    [additionally]} : <attribute names>
table menu choices for [the <attribute names> of]
    any <class or classes> {include [additionally] |
    exclude [additionally]} <table menu choices>
```

The user restriction clauses that follow the mode filters can both remove and add user interface capability in G2 Ver. 2.11B. In essence, anything that can be asserted on a higher level, either additive or subtractive, can be undone on a lower level in G2 Ver. 2.11B.

In G2 Ver. 2.11B, the user restriction clauses that follow the mode filters each have one of the following sets of words within the user restriction clause:
includes
includes additionally
excludes
excludes additionally
implies The user restriction clauses that involve menu choices and selection upon clicking will be explained in detail below. The behavior of the other user restriction clauses is similar in principle and follow from an understanding of the former.

The user restriction clauses that involve menu choices and selection upon clicking have the following general grammar:

```
menu choices for <class or classes>
    {include [additionally] | exclude
    [additionally]}: <menu choices>
selecting any <class or classes> implies
    <menu choice>
```

User restriction clauses of this type are applicable when the user clicks on an item. In the absence of user restrictions, G2 Ver. 2.11B would display a menu for the item on the user's window. The user restrictions modify this so that either the menu appears but with some of its choices removed, or one of the choices is executed without displaying the menu.

The information available with which to conduct the user restriction search is the following:
the user mode of the user's window;
the item;
the set of menu choices applicable to the item in the absence of any user restrictions;
the path up the workspace hierarchy starting with the item and ending with a top level workspace, and the user restrictions, if any, in each of these items;
the user restrictions in kb-restrictions.

The user restriction search proceeds in this manner:
the user restrictions are read in the bottom up order previously described—each group of user restrictions has a mode filter, and the group is ignored unless the mode filter indicates that the group applies based upon the user mode;
only clauses that begin with menu choices for or selecting any . . . implies are applicable in this context (other clauses apply to non-selecting gestures, and to table display and interaction)—the rest are ignored;
only user restriction clauses that apply to a class that the item is a member of are applicable, the rest are ignored (i.e., the class or classes listed near the beginning of the user restriction clause must contain at least one class in the class inheritance path of the item);
the search must end either with a subset of the original menu choices with which to build the menu, or with the decision to execute one of them without displaying a menu, or with no action;
a menu choice will be executed rather than a menu being displayed if a user restriction clause containing selecting any . . . implies is read on the search before a clause containing exclude or include (but without additionally) is encountered;
if there is no such selecting any clause, then the menu choices must be filtered—the following describes the filter as applying to a single choice from among the set of menu choices that would have appeared absent any user restrictions, however, the actual search is done for the entire group so as to be efficient:
include—if the choice is not listed, it is not included, and the search is over; if the choice is listed, it is included and the search is over;
include additionally—if the choice is not listed, the search continues; if the choice is listed, it is included and the search is over;
exclude—if the choice is listed, it is not included and the search is over; if the choice is not listed, it is included and the search is over;
exclude additionally—if the choice is listed, it is not included and the search is over; if the choice is not listed, the search continues;
if the search ends with no decision, the menu choice is included.

As noted previously, it is frequently easier to understand the logic of how user restrictions work if one considers how they read in English in top down order. To do this, read them starting with the kb-restrictions, and then read the user restrictions starting with those in the top level workspace and descending the workspace hierarchy, ending with the user restrictions in the item toward which the user's gesture is made.

Restrictions beginning with menu choices for . . . include: are intended to furnish a complete specification of included menu choices for the listed classes, with the presumption that all others are excluded. It is a general declaration, and overrules any statement made at a higher level. But it may have exceptions at a lower level.

User restrictions beginning with menu choices for . . . exclude: are similar in scope, but complementary in that they furnish a complete specification by listing all menu choices that are to be excluded, with the presumption that all others are included.

User restriction of the form menu choices for . . . include additionally and menu choices for . . . exclude additionally are intended to modify the specification inherited from a higher level by including or excluding some more menu choices respectively. These declarations make no assumption about menu choices they do not specifically mention.

User restrictions beginning with selecting any . . . implies are intended to override menu choices generally, and to replace them with the execution of a single action. A selecting any user restriction placed at a higher level can be overridden by one placed at a lower level.

5. Inadequacies of the G2 Ver. 2.11B Access Restriction System

The access restriction system of G2 Ver. 2.11B has proven to be an extremely convenient and versatile means for configuring a user interface. Unfortunately, however, it has also been found that the user restriction construct employed in the access restriction system of G2 Ver. 2.11B is not adequate for all purposes.

More particularly, as noted above, in G2 Ver 2.11B user restrictions cannot be applied against the system administrator. This is a deliberate design feature of G2 Ver. 2.11B, based on the premise that the system administrator should generally be able to view and modify all aspects of the application program. As a consequence of this design choice, however, it has also been discovered that vendors marketing customized G2 Ver. 2.11B applications to end users lack suitable means for preventing the end user's administrator from viewing and modifying various aspects of the vendor's application program, More particularly, in G2 Ver 2.11B the vendor is able set up user restrictions which restrict the access of all non-administrators from vendor-created workspaces, but the vendor is unable to set up any user restrictions which will prevent the end user's administrator from gaining access to all aspects of the application program, including vendor-created workspaces.

See, for example, FIG. 12, which shows a G2 Ver. 2.11B screen display 320. Display 320 comprises a vendor-created workspace 325 having a vendor-created class definition 330 thereon, and a user-created workspace 335 having an object 340 thereon, where object 340 is an instance of the class represented by class definition 330. In this situation, the end user's administrator could gain access not only to the user-created workspace 335, but also to the vendor-created workspace 325 and to the vendor-created class definition 330.

It has been recognized that such administrator access to vendor-created workspaces can present serious concerns for the vendor, for two different reasons. First, the vendor-created workspaces frequently contain valuable trade secrets and work product of the vendor which the vendor may wish to keep confidential. Obviously the contents of such vendor-created workspaces cannot remain confidential so long as the end user's administrator can obtain access to these workspaces. Seconds and perhaps more importantly, many G2 Ver. 2.11B applications are used to control critical manufacturing and/or service-related processes, where system failures could have serious safety and/or economic consequences. On account of this, the vendor frequently needs to ensure that certain critical, time-proven sections of the application program be effectively secured against any alteration by the end user, since such alteration could undermine the system's integrity and thereby render it unreliable.

On account of the foregoing, vendors of G2 Ver. 2.11B application programs have tried a variety of different techniques in an effort to prevent the end user's administrator from gaining access to vendor-created workspaces.

For example, some vendors have deleted source code remarks from, and altered meaningful object names in, the distributed application program in an effort to inhibit end user administrators from viewing and modifying the application program. While the use of such techniques can help conceal the vendor's trade secrets and work product to some extent, it is generally not completely successful in this respect. Furthermore, the use of such techniques is generally not preferred since it tends to complicate and undermine the vendor's own maintenance of the application program. In addition, the use of the foregoing techniques still does not prevent end user administrators from copying various vendor-created objects into user-created workspaces, nor does it prevent end user administrators from then using these objects in thier own user-created workspaces. It will be appreciated that such a practice can seriously undermine program integrity, particularly where helpful source code remarks have been deleted and meaningful object names altered.

In view of the foregoing, G2 Ver. 2.11B provides that certain workspaces may be declared to be proprietary. This is done by giving the workspace the appropriate attribute in its attribute table. By definition, once a workspace has been made proprietary, all users—including administrators—are barred from thereafter cloning or transferring any items on that proprietary workspace. Thus, vendors can to some extent restrict access to a vendor-created workspace by declaring that workspace to be proprietary before shipping the application program to the end user; thereafter no end user—including the administrator—will be able to clone or transfer any items on that proprietary workspace. Unfortunately, however, the proprietary declaration construct of G2 Ver. 2.11B is only able to provide the vendor with a rough tool for restricting end user access to a vendor-created workspace, since it is predefined in scope and principally prohibits the subsequent cloning and transferring of objects placed upon a proprietary workspace. Thus, for example, an end user administrator can still view, among other things, the attributes of any objects placed upon a vendor-created workspace which has been declared proprietary.

On account of the foregoing, it has been recognized that an improved access restriction system is needed in order to allow vendors to quickly, easily and effectively prevent end user administrators from gaining any access to vendor-created workspaces.

OBJECTS OF THE INVENTION

Accordingly, one object of the present invention is to provide suitable means by which end user administrators can be quickly, easily and effectively barred from gaining any access to vendor-created workspaces.

Another object of the present invention is to provide an improved access restriction system which can be used to configure a user interface and to make an application secure.

Yet another object of the present invention is to provide an access restriction system which is based on, and improves upon, the access restriction system provided in G2 Ver. 2.11B.

Still another object of the present invention is to provide an access restriction system which is a superset of the access restriction system provided in G2 Ver. 2.11B, whereby the access restriction system of G2 Ver. 2.11B will remain fully available to a user of the present invention.

Another object of the present invention is to provide a novel method for configuring a user interface.

SUMMARY OF THE INVENTION

These and other objects are addressed by the present invention, which comprises an access restriction system which is generally similar to the access restriction system provided in G2 Ver. 2.11B, except that three new constructs have now been added in the new access restriction system of the present invention.

First, the access restriction system includes a new propietary mode construct. This construct serves as an additional mode filter for user restrictions, so that user restrictions can now be applied against all users, including system administrators.

Second, the access restriction system includes a new type of access restriction known as class restrictions. When these class restrictions are placed on a class definition within a given workspace, they will flow outside that workspace with all instances of that class. Thus, class restrictions flow through the class hierarchy.

Third, the access restriction system includes a new absolutely access restriction clause construct. This construct extends the grammar of restriction clauses appearing in user restrictions and/or the new class restrictions so as to render the restriction clauses incapable of being reversed at a lower level by another restriction clause.

The three new constructs can be implemented, either alone or in combination with one another, in an access restriction system of the type comprising (a) workspaces, workspace hierarchies and inheritance of properties through the workspace hierarchy; (b) classes, class hierarchies and inheritance of properties through the class hierarchy; (c) a system of user restrictions which flow through the workspace hierarchy; and (d) a system of class restrictions which flow through the class hierarchy. Alternatively, the new proprietary mode construct and the new absolutely access restriction clause construct can both be incorporated, either alone or in combination with one another, in an access restriction system of the type comprising (a) workspaces, workspace hierarchies and inheritance of properties through the workspace hierarchy; and (b) a system of user restrictions which flow through the workspace hierarchy.

In the preferred form of the invention, all three new constructs are implemented together, in conjunction with the existing access restriction system of G2 Ver. 2.11B. Thus the preferred embodiment of the present invention provides an access restriction system which is a superset of the access restriction system provided in G2 Ver 2.11B. Such an access restriction system is embodied in G2 Ver. 3.0.

BRIEF DESCRIPTION OF THE DRAWINGS

Still other objects and features of the present invention will be more fully disclosed or rendered obvious by the following detailed description of the preferred embodiment of the invention, which is to be considered together with the accompanying drawings wherein like numbers refer to like elements and further wherein:

FIG. 13 is a schematic flow chart illustrating the order in which access restrictions (including both user restrictions and class restrictions) are read in G2 Ver. 3.0;

FIG. 14 is a schematic representation of a G2 Ver. 3.0 screen display illustrating an aspect of G2 Ver. 3.0.

DETAILED DESCRIPTION OF THE PREFERRED EMBODIMENT

1. Proprietary Mode 1.1 Overview

Figure 1:
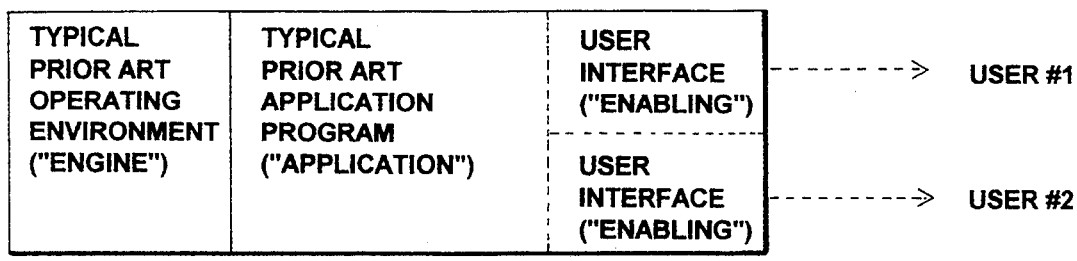
FIG. 1 is a schematic diagram showing the user interface architecture of a typical prior art multi-user/computer system.
Figure 2:
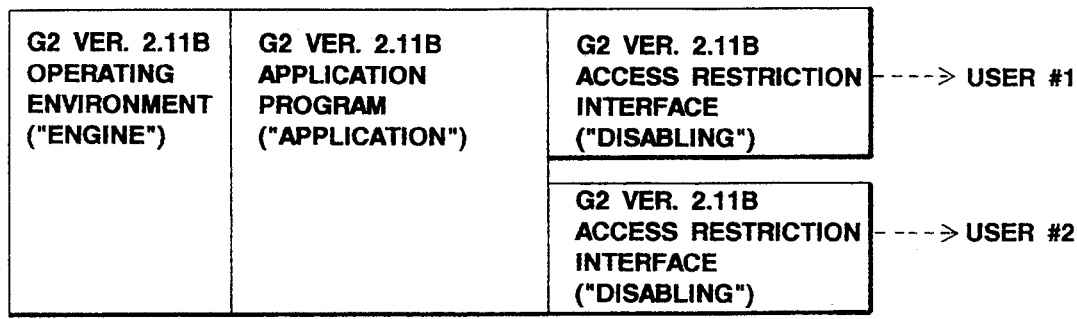
FIG. 2 is a schematic diagram showing the user interface architecture of the G2 Ver. 2.11B multi-user computer system.
Figure 3:
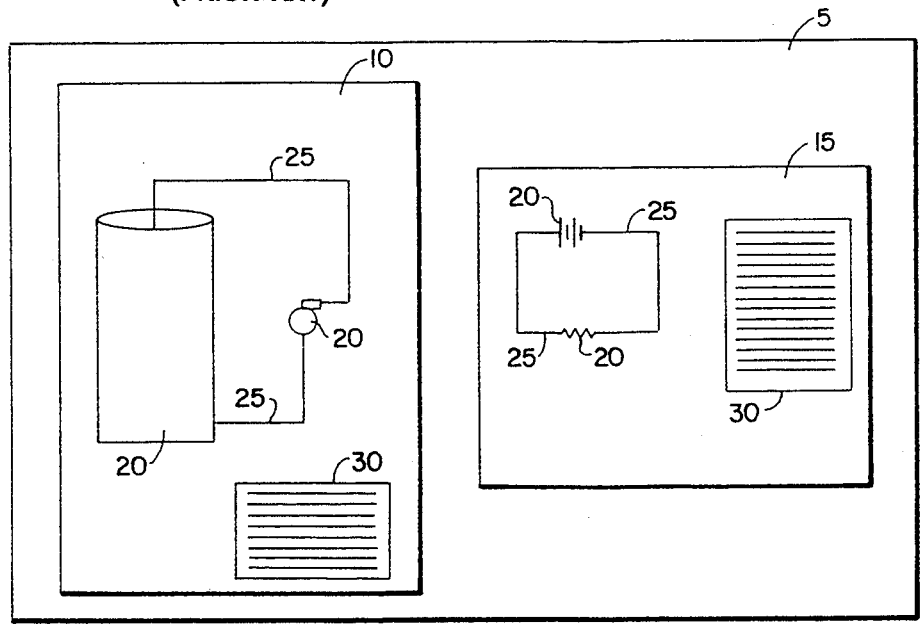
FIGS. 3–5 are schematic representations of G2 Ver. 2.11B screen displays illustrating various aspects of G2 Ver, 2.11B.
Figure 4:
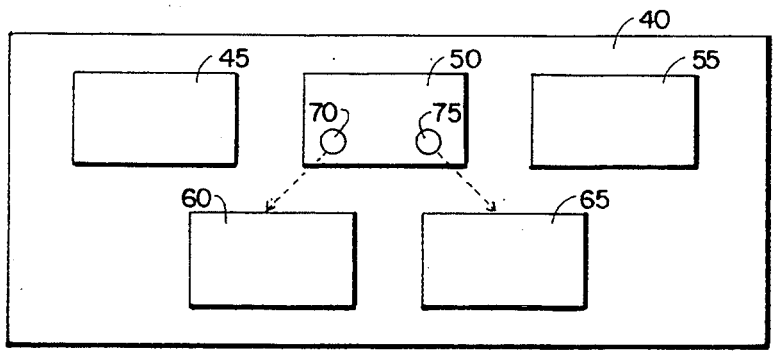
Figure 5:
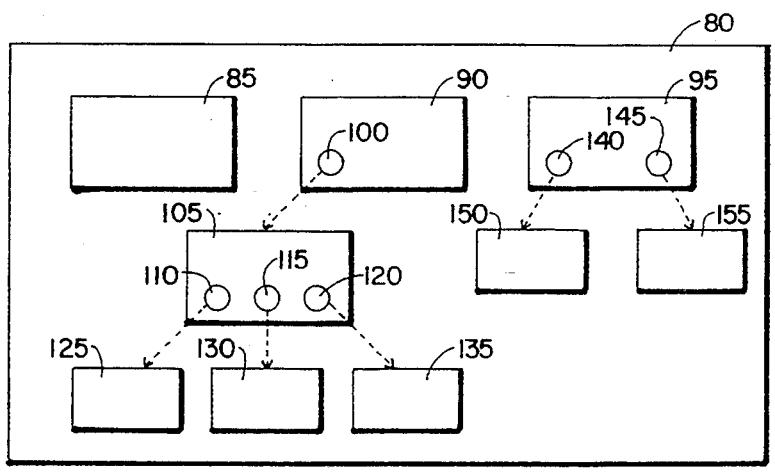
Figure 6:
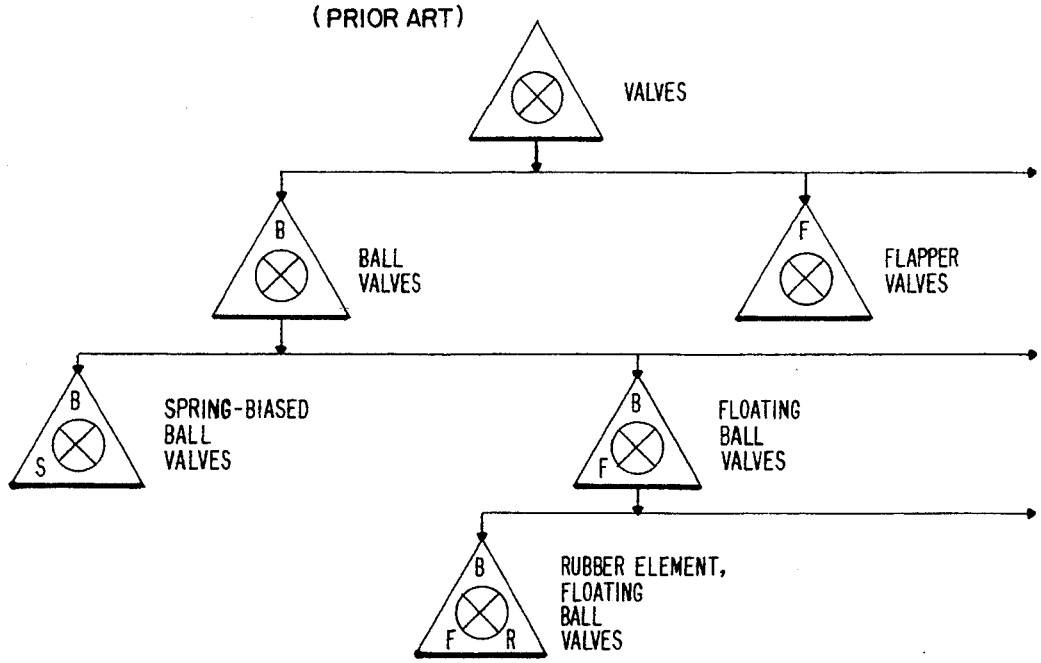
FIG. 6 is a schematic representation of a simple, illustrative class hierarchy relating to valves.
Figure 7:
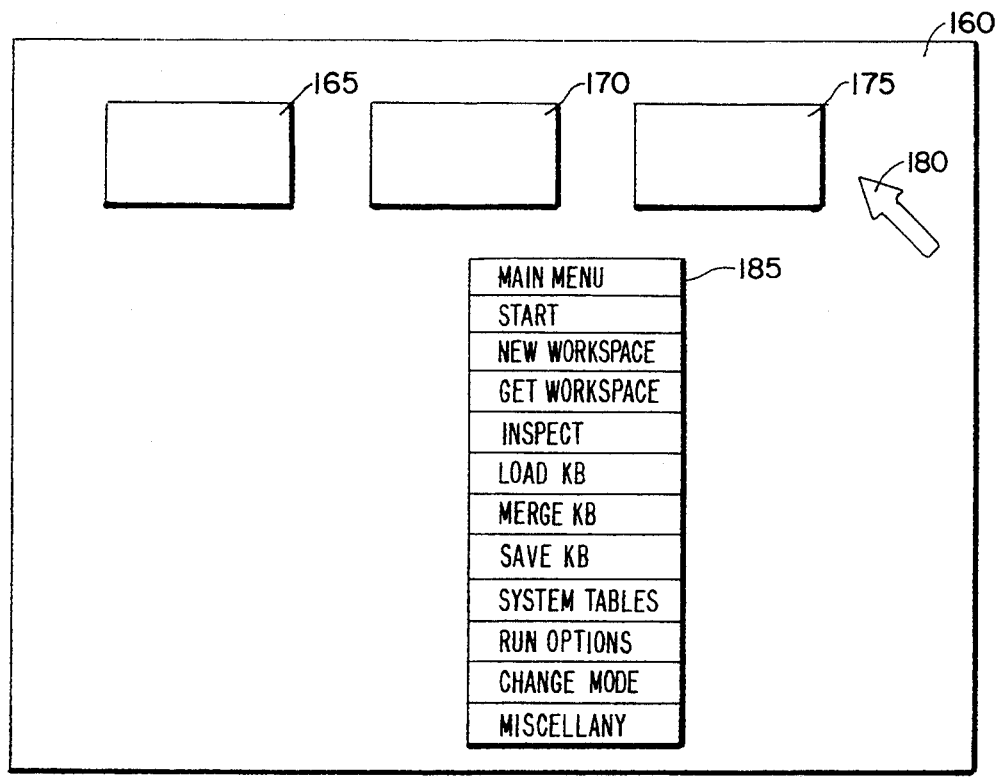
FIGS. 7–10 are schematic representations of G2 Ver. 2.11B screen displays illustrating various aspects of G2 Ver. 2.11B.
Figure 8:
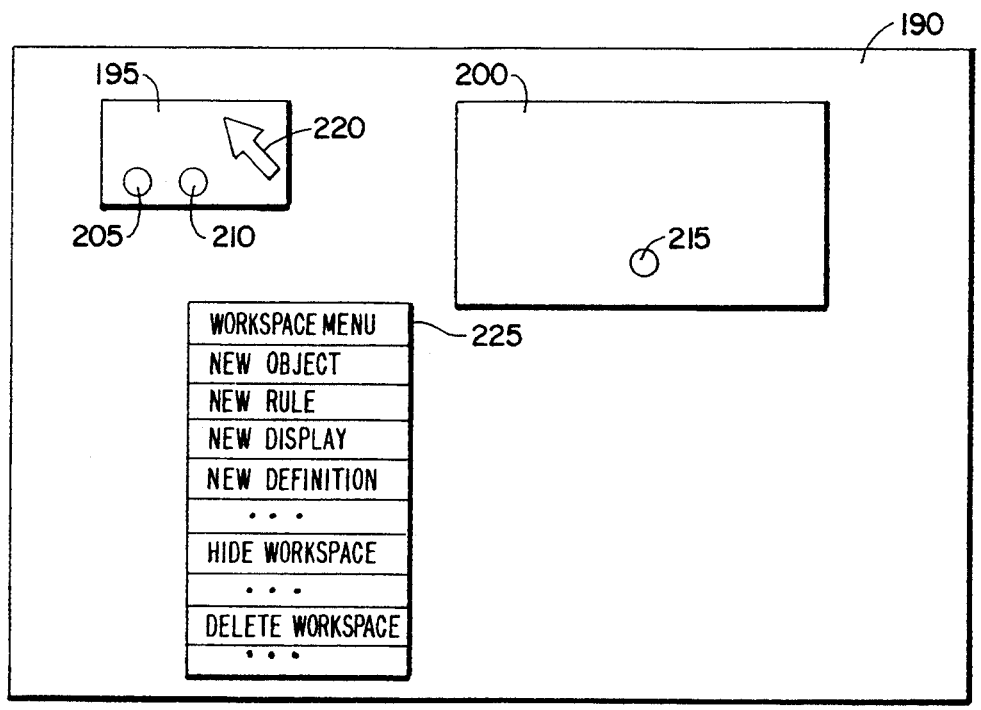
Figure 9:
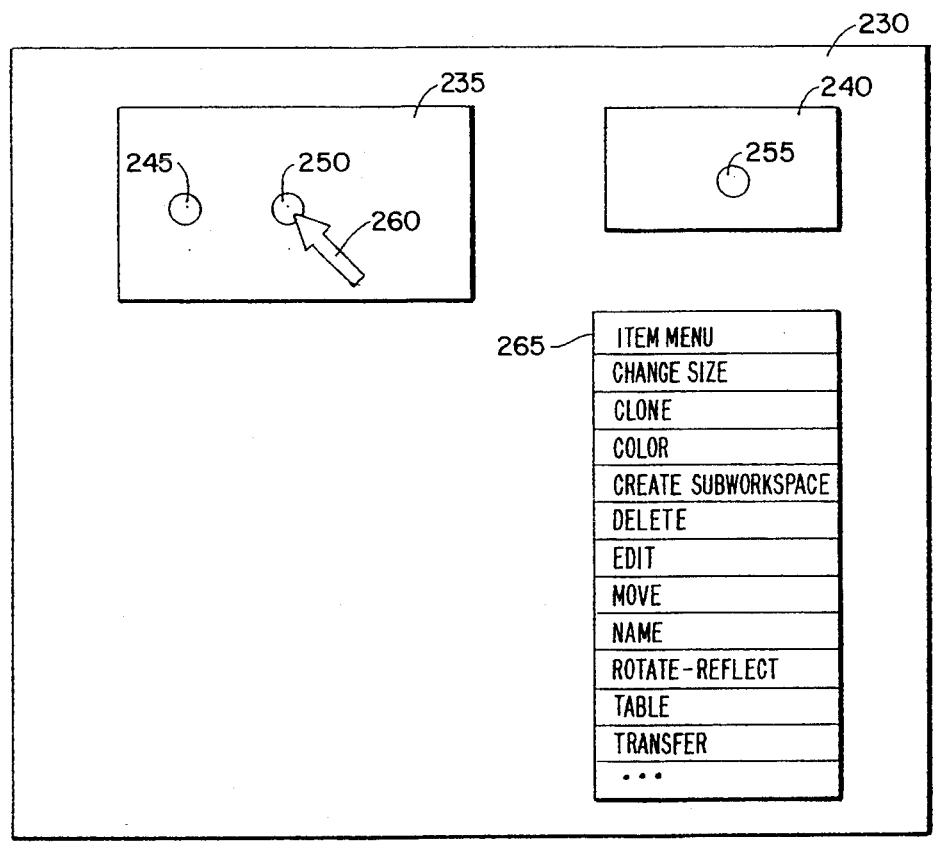
Figure 10:
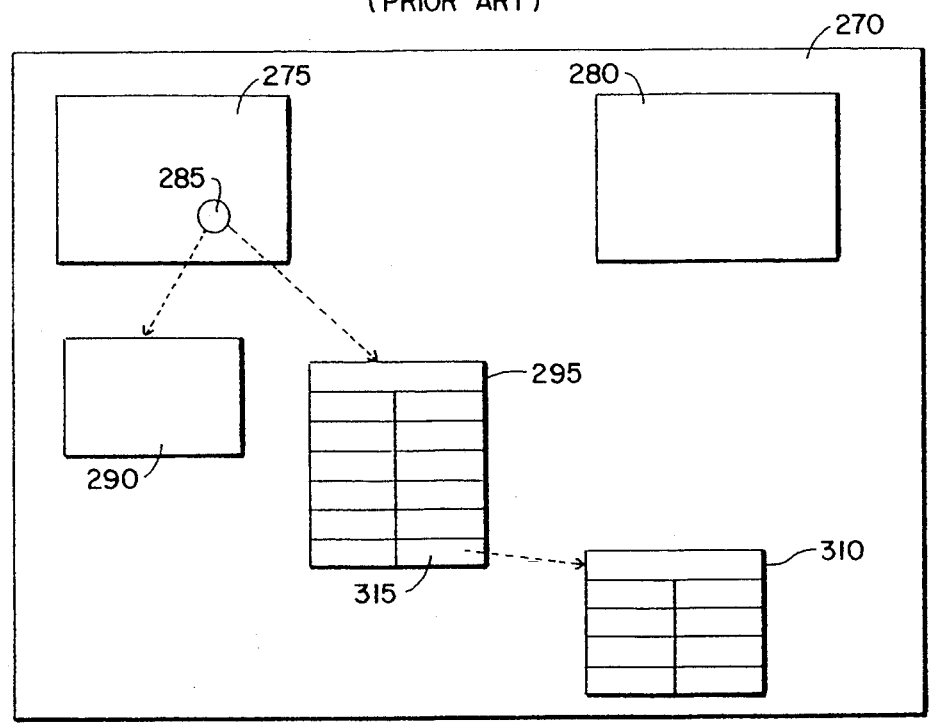
Figure 11:
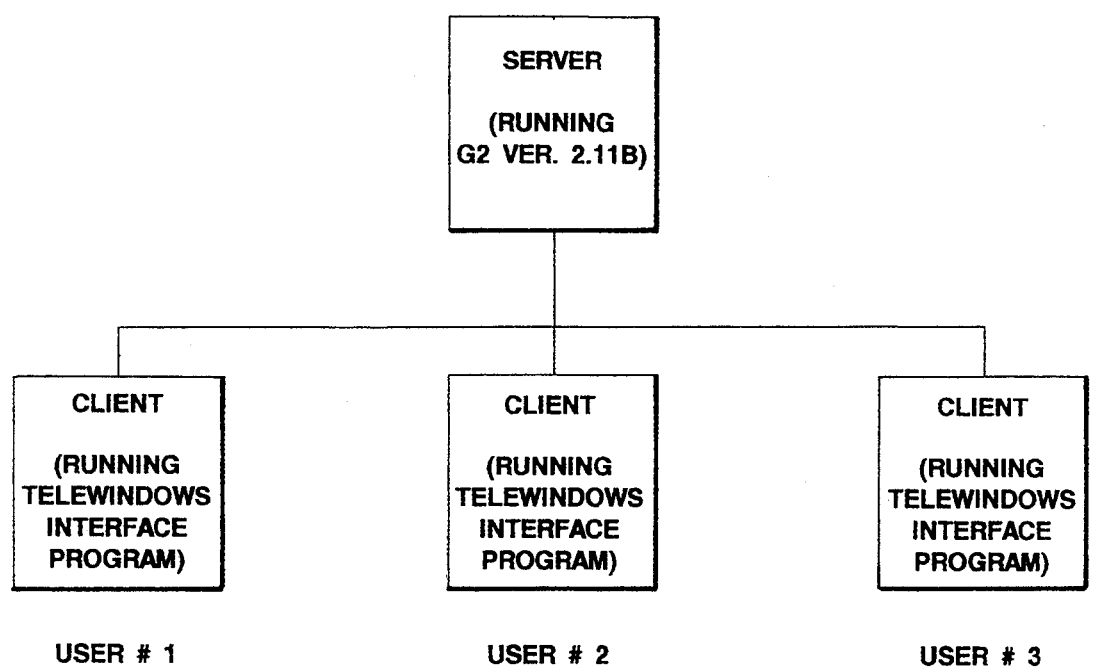
FIG. 11 is a schematic representation of a typical multi-user computer network running G2 Ver. 2.11B.
Figure 11A:
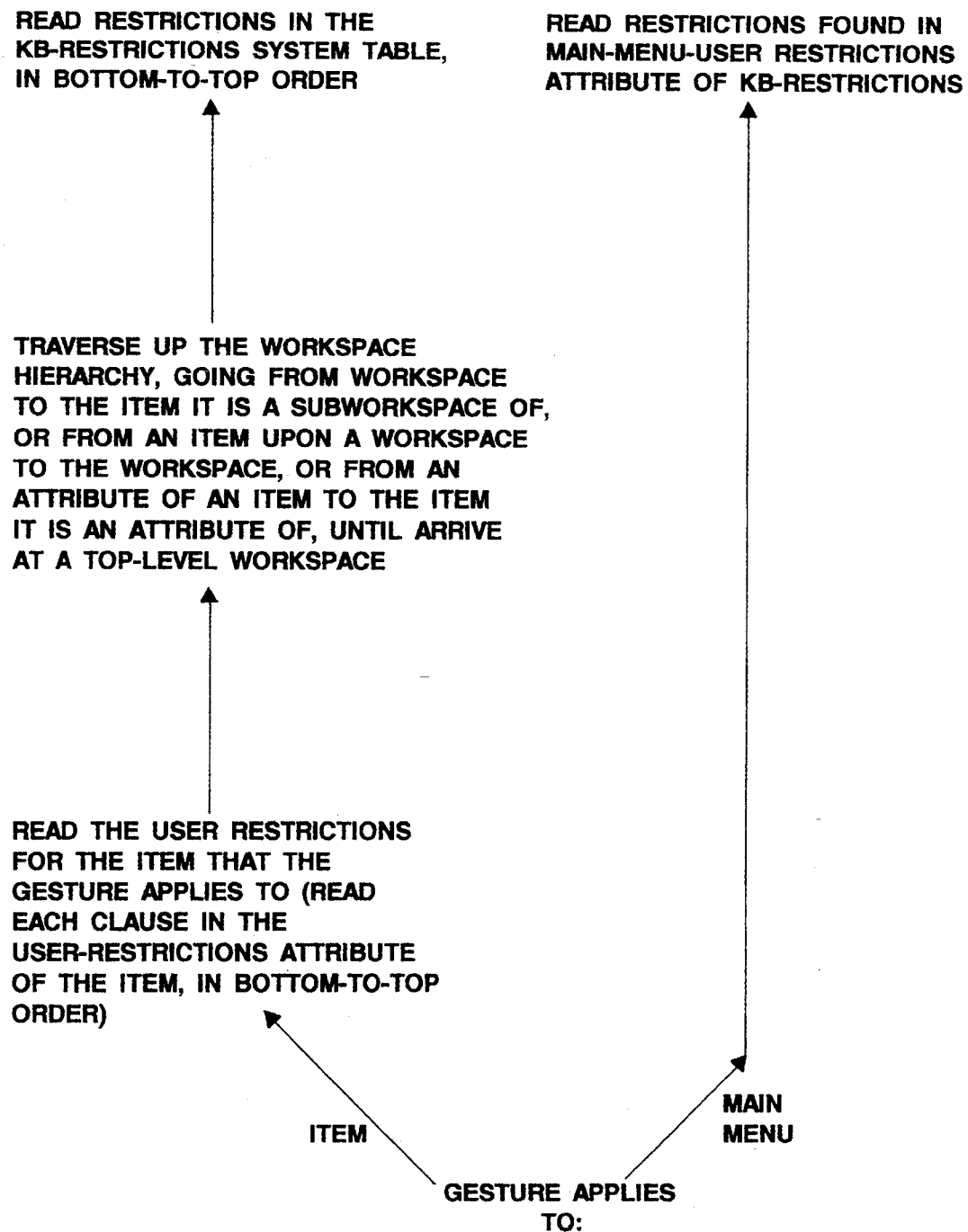
FIG. 11A is a schematic flow chart illustrating the order in which user restrictions are read in G2 Ver. 2.11B.
Figure 12:
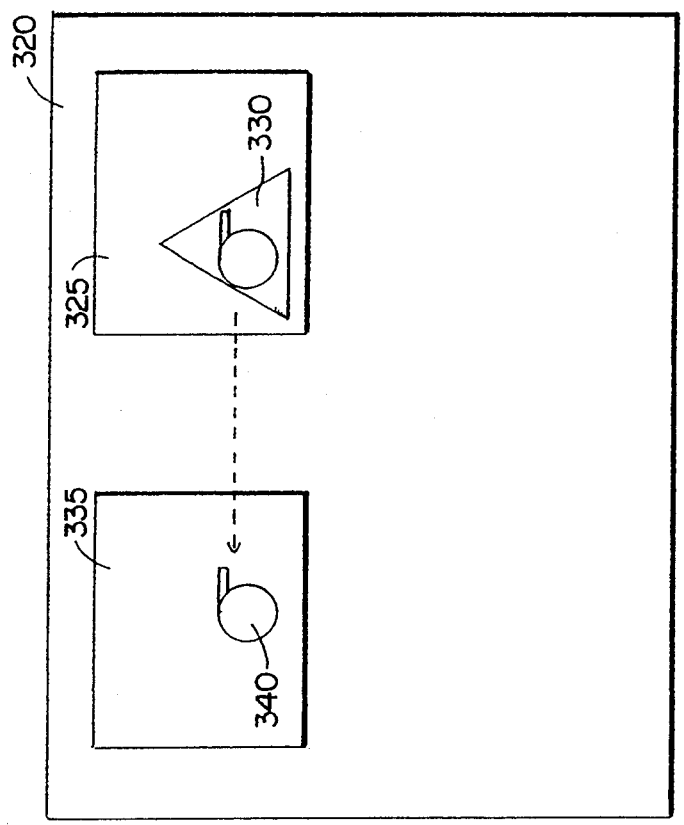
FIG. 12 is a schematic representation of a G2 Ver. 2.11B screen display illustrating an aspect of G2 Ver. 2.11B.
Figure 11B:
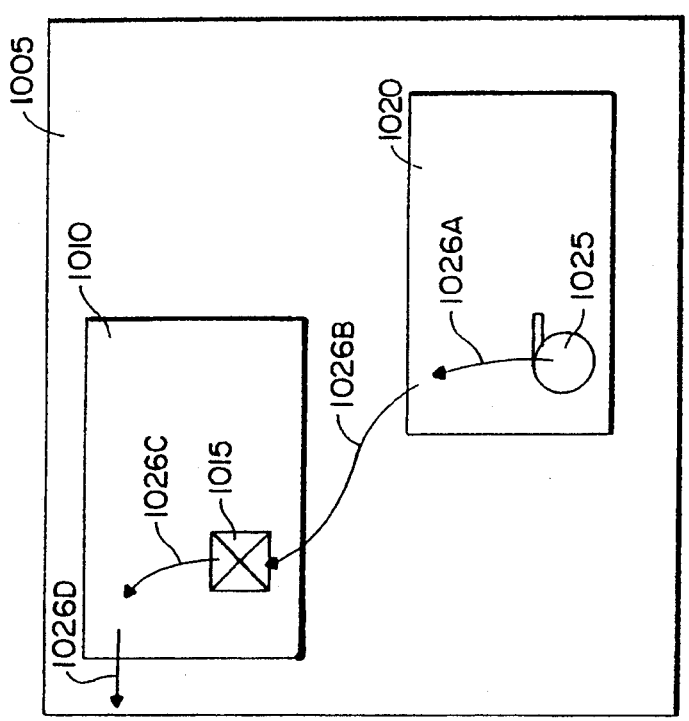
FIG. 11B is a schematic representation of a G2 Ver. 2.11B screen display illustrating an aspect of G2 Ver. 2.11B.
Figure 11C:
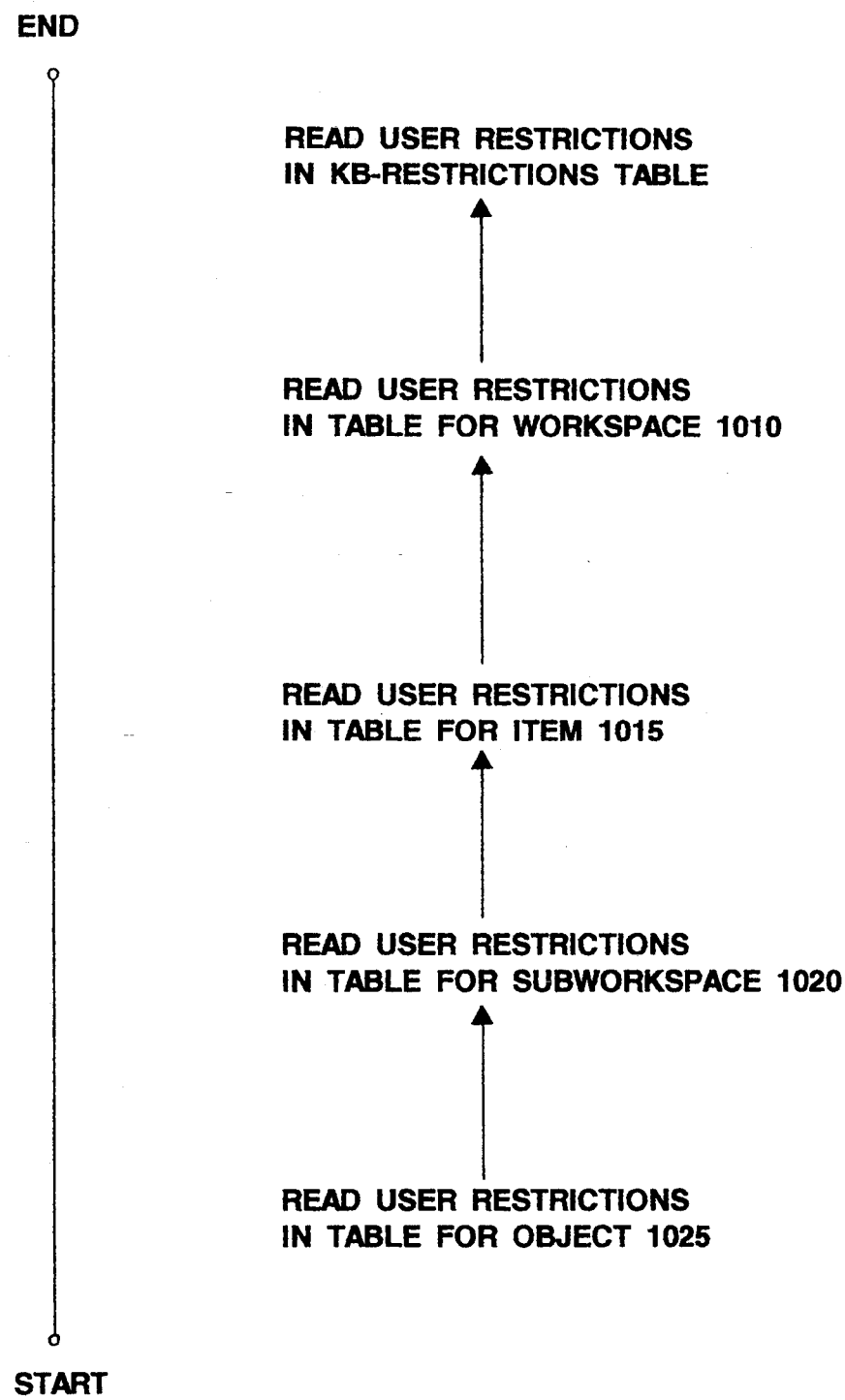
FIG. 11C is a schematic flow chart illustrating the order in which user restrictions are read in the example shown in FIG. 11B.
Figure 11D:
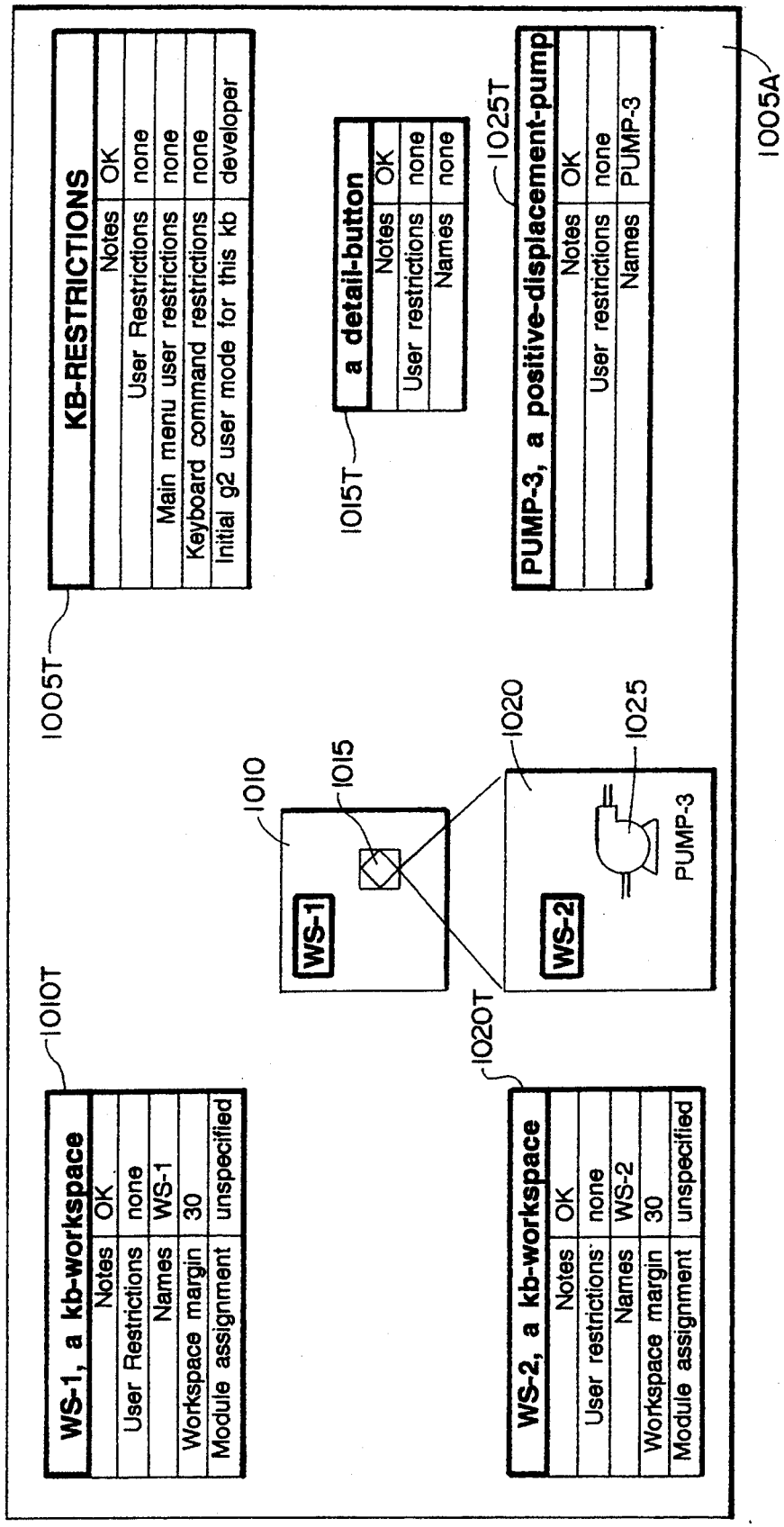
FIG. 11D is a schematic representation of a G2 Ver. 2.11B screen display, illustrating various items related to the example shown in FIG. 11B.

In order to provide a suitable means by which vendors can prevent end user administrators from gaining any access to a vendor-created workspace, a new proprietary mode construct has now been implemented in the access restriction system of G2 Ver. 3.0. As will hereinafter be discussed in further detail, the use of this new proprietary mode construct now permits user restrictions to be applied against all users, including system administrators, so as to deny access to selected portions of the application program.

1.2 Design Considerations

The implementation of this new proprietary mode construct in the access restriction system of G2 Ver. 3.0 has required several significant creative steps.

First, at the outset, it must be appreciated that the very notion of completely eliminating administrator access to vendor-created workspaces in systems of the type employing access restrictions is somewhat contrary to the original concept of the access restriction system itself. More particularly, historically, the access restriction system was created for use in a system where one type of user i.e., the administrator, was to have broad control over the system and relatively complete access to the application program, and the remaining types of users were to be provided with lesser degrees of control over the system and more restricted access to the application program. It was with this purpose in mind that the access restriction system was created—it provided a unique means for quickly and easily building the customized user interface needed for each different type of non-administrator user, while leaving the user interface for the system administrator substantially fully enabled and generally completely functional. Indeed, in G2 Ver. 2.11B, the access restriction system is based almost exclusively on the use of user restrictions, which in G2 Ver. 2.11B are totally ineffective against the system administrator. Furthermore, while it is true that workspaces can be declared proprietory in G2 Ver. 2.11B, thereby placing some limitations on what even administrators can do with respect to objects placed on those workspaces, those limitations are relatively few in number. Thus it will be seen that the very notion of completely eliminating administrator access to vendor-created workspaces in systems of the type employing access restrictions is somewhat at odds with the original concept of an access restriction system itself.

A second step in creating the new proprietary mode construct of the present invention relates to the general strategy employed. More particularly, having concluded that means should be provided for limiting the access of end user administrators to vendor-created workspaces, a determination still had to be made as to the general strategy for implementing this means. Thus, for example, such means could have been implemented by providing a separate facility for closing off selected vendor-created workspaces. In the present invention, however, it has been recognized that such means can be better provided by modifying (i.e., extending) the system of user restrictions already employed in G2 Ver. 2.11B. This arrangement has the significant advantage that it utilizes the framework of user restrictions already present in the system and already generally familiar to both vendors and end users.

A third step in creating the new proprietary mode construct of the present invention relates to the actual implementation utilized. More particularly, having concluded that means should be provided for limiting the access of end user administrators to vendor-created workspaces, and having concluded that such means should be provided by modifying the system of user restrictions already present in G2 Ver. 2.11B, a detemination still had to be made as to precisely how this implementation would occur.

The specific manner in which the new proprietary mode construct has been implemented in G2 Ver. 3.0 will now be described.

1.3 Implementation

It will be recalled that in G2 Ver. 2.11B user restrictions are filtered by the user mode. More particularly, groups of user restriction clauses are preceded by mode filters which are in the form:

when in <mode or modes>: ...
unless in <mode or modes>: ...

The mode filters in G2 Ver. 2.11B determine whether the user restriction clauses following the mode filter are read or ignored. If the mode filter begins with when, then the user restriction clauses are read if the user mode of the window from which the gesture was made is one of the modes specified in the mode filter. If the mode filter begins with unless, the user restriction clauses are read if the user mode of the window from which the gesture was made is not one of the modes specified in the mode filter. Thus, the mode filters of G2 Ver. 2.11B determine whether the user restriction clauses following the mode filter are read or ignored, depending on whether the user mode of the window from which the gesture was made is one of the modes specified in the mode filter of the user restriction.

With the user modes of G2 Ver. 2.11B, it is important to appreciate that the user mode relates to the window from which the gesture was made. These user modes can be the one built-in mode having special behavior (i.e., the administrator mode) or any other user-defined mode (e.g. a maintenance engineer mode, a system programmer mode, a data entry clerk mode, etc.). As noted previously, however, with these user modes of G2 Ver. 2.11B, user restrictions can only be applied against non-administrator users, and can never be applied against system administrators.

It will also be recalled that in G2 Ver. 2.11B the access restriction system provides that certain workspaces can be declared to be proprietary. By definition, once a workspace has been declared proprietary, all users—including administrators—are barred from thereafter cloning or transferring any items on that proprietary workspace.

In G2 Ver. 2.11B, the proprietary declaration construct is totally separate and distinct from the user restriction constructs.

The new proprietary mode construct of the present invention is generally related to the foregoing user modes and user restrictions of G2 Ver. 2.11B, but it significantly expands upon the power of the same.

More particularly, in the present invention embodied in G2 Ver. 3.0, a new construct called proprietary mode has been created for use as a mode filter on user restrictions, after when in, in substantially the same manner that user modes are used in G2 Ver. 2.11B. G2 Ver. 3.0 provides this new proprietary mode construct, as well as all of the existing user mode constructs of G2 Ver. 2.11B, for use as a mode filter for user restrictions in G2 Ver. 3.0.

Thus it will be seen that in G2 Ver. 3.0, user restrictions are specified according to the following convention:

```
{none |
   when in <user mode and/or proprietary> mode:
      <restriction or restrictions>
   unless in <user mode or modes> mode:
      <restriction or restrictions>}
```

Note that, unlike the prior art user modes available in G2 Ver. 2.11B, which can be used after either when in or unless in, the new proprietary mode construct is only available as a mode filter on user restrictions after when in. It may not be used as a mode filter on user restrictions after unless in. It should also be appreciated that the specific user restriction clauses used in G2 Ver. 3.0 after the mode filters are exactly the same as the five different kinds of user restriction clauses specified above with respect to G2 Ver. 2.11B, except as they may be expanded through the use of the new absolutely access restriction construct of the present invention, as will hereinafter be discussed in further detail.

Unlike the prior art user modes available in G2 Ver. 2.11B, which relate to the window from which the gesture was made, the new proprietary mode construct of G2 Ver. 3.0 applies if the item toward which the gesture is made is a proprietary workspace, or if it is placed below a proprietary workspace in the workspace hierarchy. Thus it will be seen that the proprietary mode construct of the present invention is tied to a workspace rather than to a window through which a particular user interacts.

In addition to the foregoing, the proprietary mode construct of the present invention applies equally against all users, including administrators. Thus, the proprietary mode construct can be used to restrict all user access—including administrator access—to selected workspaces. This feature is particularly useful when one considers the problem of how an application program vendor can secure some or all of the application program from being accessed by an end user, including an end user administrator.

More particularly, it will be seen that a vendor can declare certain workspaces to be proprietary and write certain user restrictions relating to these proprietary workspaces so as to inhibit a user from viewing, modifying or copying the workspace or items on the workspace. As noted above, these user restrictions are attached to the workspaces themselves and apply against all users, including end user administrators. Accordingly, when the G2 Ver. 3.0 application program is thereafter delivered to an end user, that user— regardless of his or her user type—will be unable to access the contents of the proprietary workspaces according to the user restrictions written by the vendor.

See, for example, FIG. 13, which shows a G2 Ver. 3.0 screen display 345. Display 345 comprises a vendor-created workspace 350 having a vendor-created class definition 355 thereon, and a user-created workspace 360 having an object 365 thereon, where object 365 is an instance of the class represented by class definition 355. In this example, the vendor-created workspace 350 has been made proprietary, as diagrammatically represented by the dashed line 370 placed around workspace 350. With workspace 350 proprietary, any user restrictions applied to this workspace using the proprietary mode filter will apply equally against all users, including system administrators. Thus, by placing appropriate user restrictions on workspace 350 which inhibit viewing, modifying or copying the workspace or items on the workspace, end user access to a vendor-created workspace can be prohibited.

In essence, then, the combination of proprietary workspaces and proprietary mode user restrictions make it possible to introduce another dimension of selectivity in the control of the user interface, which control may be applied against administrators as well as other user types.

By way of example, the proprietary mode construct can be used to make user restrictions that prevent an end user—even if they are an administrator—from viewing an attribute of an item or from editing an attribute of an item. More particulary, if a workspace is proprietary, and if the user-restrictions attribute on its table contains the restriction:

---
when in proprietary mode:
    attributes visible for item exclude absolutely:
        attribute-x;
    table menu choices for the attribute-y of
        any item exclude : edit
--- then the attribute-x will not be visible to any user—including a system administrator—in the portion of the workspace hierarchy rooted in that workspace; and the attribute-y cannot be edited by any user—including a system administrator—in the portion of the workspace hierarchy rooted in that workspace.

In this manner, an entire section of a knowledge base can be locked so that a user cannot view or modify any of the programmatic components on it.

1.4 Additional Considerations

The new proprietary mode construct of G2 Ver. 3.0 goes a long way toward preventing end user administrators from accessing vendor-created workspaces. Unfortunately, however, it has been found that in some circumstances, the use of the proprietary mode construct alone is insufficient to provide vendors with the level of closure desired.

More particularly, it will be recalled that in G2 Ver. 2.11B, user restrictions can be placed on workspaces and flow through the workspace hierarchy. User restrictions can also be placed on class definitions which are located within a given workspace. However, in G2 Ver. 2.11B, user restrictions which are placed on class definitions which are located within a given workspace do not flow outside that workspace through the class hierarchy with specific instances of that class definition; they can only flow outside that workspace, to the subworkspace (if any) of that class definition, through the workspace hierarchy.

In view of the foregoing, it has been found that if G2 Ver. 2.11B is simply modified so as to provide the aforementioned proprietary mode construct, in some circumstances an inadequate level of closure will be attained.

In particular, it has been found that if a user restriction is placed on a class definition which is located on a proprietary workspace, that user restriction will be effective against all instances of that class definition within the subworkspace (if any) of that class definition. However, since in G2 Ver. 2.11B user restrictions which are placed on a class definition do not flow outside the workspace through the class hierarchy, instances of the class occurring outside the subworkspace (if any) of that class definition will not have the desired user restrictions placed on them.

Similarly, it has been found that if a user restriction is placed on a proprietary workspace which also contains a class definition, that user restriction will be effective against all instances of that class definition occurring within that proprietary workspace. However, since user restrictions which are placed on a workspace follow the workspace hierarchy, instances of a class occurring outside a proprietary workspace will not carry the desired user restrictions, even if the class definition itself is located within the proprietary workspace.

As a result, it will be appreciated that regardless of whatever user restrictions may be provided in G2 Ver. 2.11B to limit access to any instances of the class which are located within the proprietary workspace, no user restrictions will flow through to any instances of the class which are located outside the proprietary workspace.

This can present a serious problem for the vendor, since it means that even in the case where the vendor places appropriate user restrictions on a workspace which is then made proprietary, an end user administrator will be able to access various information about an object located in a non-proprietary workspace. For example, the end user administrator would be able to access the information listed in the object's attribute table, view interactions between objects, etc. This could in turn allow the user to learn certain things about—or at least draw intelligent inferences about—things locked off in the proprietary workspace. Naturally, in many cases the vendor might not want the user to be able to do this.

Accordingly, it has been recognized that for certain applications, solely adding the aforementioned proprietary mode construct to the user restriction system of G2 Ver. 2.11B may inadequately restrict user access to vendor-created workspaces.

2. Class Restrictions 2.1 Overview

In response to this need, a new type of access restriction known as a class restriction has now been implemented in G2 Ver. 3.0 so that class restrictions which are placed on class definitions within a given workspace will flow outside that workspace with all instances of that class. In particular, in G2 Ver. 3.0, class restrictions flow through the class hierarchy.

2.2 Design Considerations

The implementation of this new class restriction construct in the user restriction system of G2 Ver. 3.0 has required several significant creative steps.

More specifically, prior to the present invention, some computer systems were already known which had workspaces, workspace hierarchies, and inheritance of properties through the workspace hierarchies.

Other systems were already known which had classes, class hierarchies, and inheritance of properties through the class hierarchies.

One system, the G2 Ver. 2.11B system, has workspaces, workspace hierarchies, and inheritance of properties through the workspace hierarchy; and classes, class hierarchies and inheritance of properties through the class hierarchy; and a system of user restrictions which flow through the workspace hierarchy.

However, it must be appreciated that prior to the present invention, which invention has been embodied in G2 Ver. 3.0, no system has previously existed which has simultaneously had workspaces, workspace hierarchies, and inheritance of properties through the workspace hierarchy; classes, class hierarchies and inheritance of properties through the class hierarchy; a system of user restrictions which flow through the workspace hierarchy; and a system of class restrictions which flow through the class hierarchy. The provision of this new class restriction construct in an access restriction system, particularly in conjunction with a system of user restrictions flowing through the workspace hierarchy, is new and unique to the present invention, and has required several significant creative steps.

The first step in creating the new class restriction construct of the present invention involved the basic recognition that it might be desirable to create an access restriction system in which some access restrictions can flow through the class hierarchy while other access restrictions can flow through the workspace hierarchy. In this respect it must be appreciated that such a concept was totally foreign to the only previously existing access restriction system, i.e., the access restriction system of G2 Ver. 2.11B. As noted above, in the access restriction system of G2 Ver. 2.11B, user restrictions are allowed to flow through the workspace hierarchy but are not allowed to flow through the class hierarchy. Any user restrictions placed on class definitions in G2 Ver. 2.11B are totally restricted to that workspace and do not flow outside that workspace.

The second step in creating the new class restriction construct of the present invention relates to the general strategy employed. More particularly, having concluded that some access restrictions should be able to flow through the class hierarchy while other access restrictions flow through the workspace hierarchy, a determination still had to be made as to the general strategy for implementing this facility. Thus, for example, such a facility could have been implemented by providing a totally new system for those restrictions flowing through the class hierarchy. In the present invention, however, it has been recognized that such a facility can be better provided by modifying (i.e., extending) the user restriction system previously employed in G2 Ver. 2.11B so as to provide for the unique features of the class restriction construct. This arrangement has the significant advantage that it utilizes the general framework of an access restriction system already present in the system and already generally familiar to both vendors and end users.

The third step in creating the new class restriction construct of the present invention relates to resolving just how the system will conduct a restriction search when access restrictions can flow through both the workspace hierarchy and the class hierarchy. In particular, it had to be determined whether one hierarchy would be given precedence over the other hierarchy and, if so, which hierarchy would dominate.

The fourth step in creating the new class restriction construct of the present invention relates to the actual implementation utilized. More particularly, having concluded that means should be provided through which some access restrictions can flow through the class hierarchy while other access restrictions flow through the workspace hierarchy, and having concluded that such means should be provided by modifying (i.e., extending) the user restriction system already present in the access restriction system of G2 Ver. 2.11B, and having determined how the system would conduct a restriction search when access restrictions can flow through both the workspace hierarchy and the class hierarchy, a determination still had to be made as to precisely how the implementation would occur.

The specific manner in which the new class restriction construct has been implemented will now be described.

2.3 Implementation

In G2 Ver. 3.0, access restrictions can now be placed on class definitions. These restrictions are called class restrictions. In G2 Ver. 3.0, class restrictions are provided in addition to, and complement, the user restrictions previously discussed.

The syntax for specifying class restrictions is exactly the same as that for specifying user restrictions, i.e., in G2 Ver. 3.0 class restrictions are specified according to the following convention:

```
{none |
  when in <user modes and/or proprietary> mode:
    <restriction or restrictions>
  unless in <user mode or modes> mode :
    <restriction or restrictions>}
```

As is the case with user restrictions in G2 Ver. 3.0, the proprietary mode construct is only available as a mode filter on class restrictions after when in. It may not be used as a mode filter on class restrictions after unless in. It should also be appreciated that the specific class restriction clauses used in G2 Ver. 3.0 after the mode filter are the same as the five different kinds of user restriction clauses specified above with respect to G2 Ver. 2.11B and G2 Ver. 3.0, and except as they may be expanded through the use of the new absolutely access restriction construct of the present invention, as will hereinafter be discussed in further detail.

Class restrictions are automatically inherited by all instances of the class they are placed on, as well as all instances of all its subclasses. Thus, in G2 Ver. 3.0, there are the traditional user restrictions that propagate throughout the workspace hierarchy, and the new class restrictions that propagate throughout the class hierarchy. Both type of restrictions are important and useful. By providing both types of access restrictions in G2 Ver. 3.0, the behavior of items can be controlled either by where an item is located (i.e., by using a user restriction propagating throughout the workspace hierarchy) or by what class of an item it is (i.e., by using a class restriction propagating throughout the class hierarchy). The interaction between these two types of access restrictions will be discussed in greater detail below.

As noted above, in G2 Ver. 2.11B and in G2 Ver. 3.0 user restrictions are placed in two different locations. More particularly, a first group of user restrictions are located in the user-restrictions attribute of every item. Thier scope is that portion of the workspace hierarchy of which that item is the root, i.e, they govern that item, and they are inherited from items to thier subworkspaces, from items to thier attributes which are items, and from workspaces to the items upon the workspace. A second group of user restrictions are located in the user-restrictions attribute of the kb-restrictions system table. This is a single global location in G2 Ver. 2.11B and in G2 Ver. 3.0. Thier scope is global. This is the only place in G2 Ver. 2.11B and in G2 Ver. 3.0 where it is possible to put menu restrictions on the Main Menu.

In G2 Ver. 3.0, class restrictions are placed in the class-restrictions attribute of object, connection and message definitions. Thier scope is all instances of the class defined by that definition, including all instances of subclasses. Class definitions do not apply to the definition itself, only its instances. Unlike traditional user restrictions, whose scope follows the workspace hierarchy, class restrictions have a scope which follows the class hierarchy.

In G2 Ver. 3.0, the order in which restrictions are read (using the bottom up convention previously described) is as follows:
  the user restrictions for the item that the gesture applies to are read, each user restriction clause being read from bottom to top, which is the reverse of the order in which they are displayed in a table;
  continuing to traverse up the workspace hierarchy, that is, from workspace to the item that it is a subworkspace of, or from an item upon a workspace to the workspace, or from an attribute of an item to the item that it is an attribute of, until one arrives at a top level workspace;
  then reading the user restrictions in the kb-restrictions system table from bottom to top;
  then, in the case of items which belong to a user defined class, reading the class restrictions of its immediate class, bottom to top;
  and continuing up the class hierarchy as far up as there are user defined classes, reading the class restrictions of each class, from bottom to top.

Again, the one exception to this is the Main Menu, where there is no item. Main Menu restrictions are found in the main-menu-user-restrictions attribute of kb-restrictions.

Figure 13A:
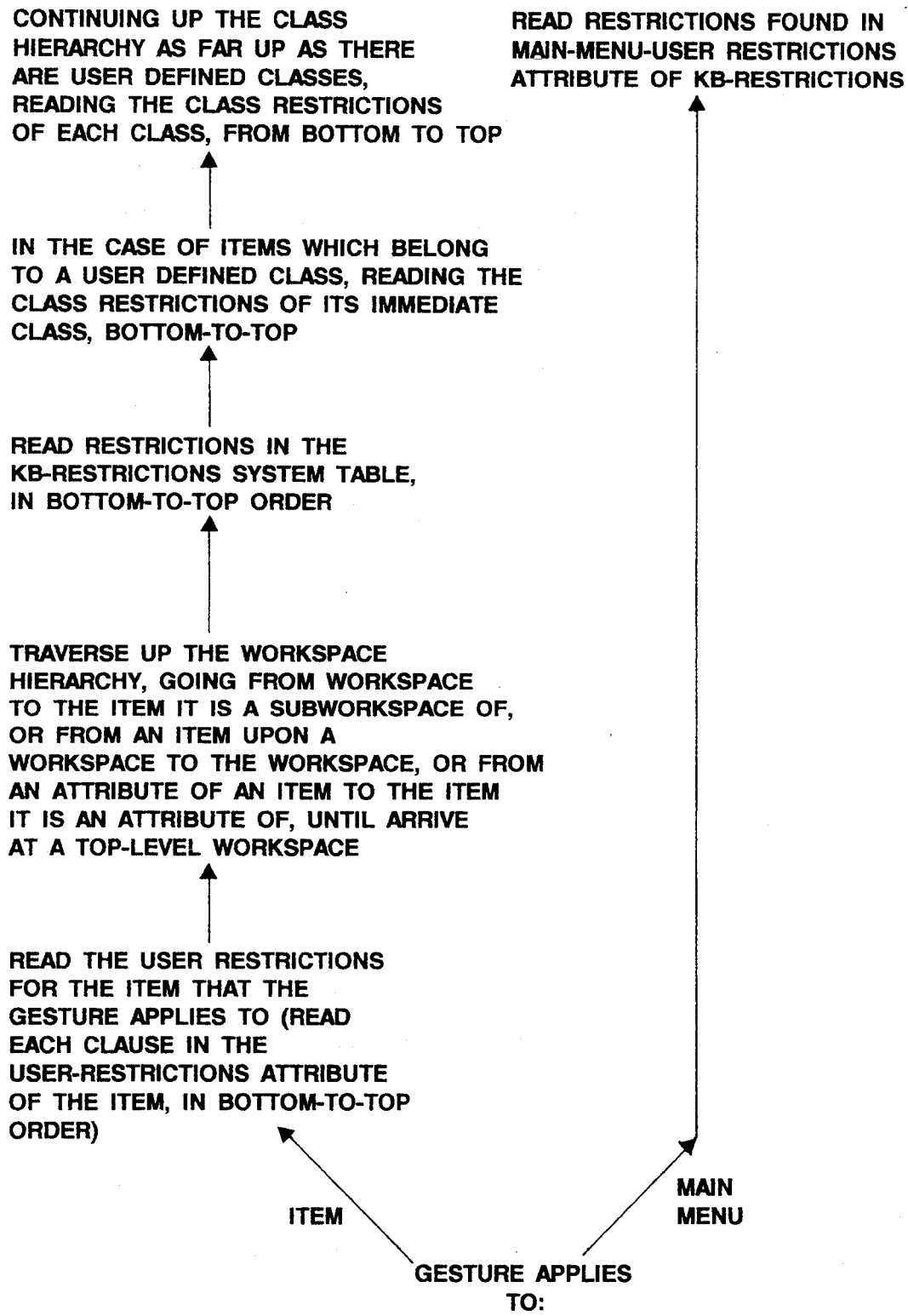
FIG. 13 is a schematic representation of a G2 Ver. 3.0 screen display illustrating an aspect of G2 Ver. 3.0.
FIG. 13B is a schematic representation of a G2 Ver. 3.0 screen display illustrating an aspect of G2 Ver. 3.0.
FIG. 13C is a schematic flow chart illustrating the order in which access restrictions are read in the example shown in FIG. 13B.
FIG. 13D is a second schematic representation of a G2 Ver. 3.0 screen display, illustrating various items related to the example shown in FIG. 13B.

See FIG. 13A, which illustrates the order in which user restrictions and class restrictions are read in G2 Ver. 3.0.

By way of further example, FIG. 13B shows the G2 Ver. 2.11B screen display 1006 that comprises a top-level workspace 1010, an item 1015 placed upon top-level workspace 1010, a workspace 1020 which is a subworkspace of item 1015, an object 1025 which is placed upon workspace 1020, a workspace 1029, a class definition 1030 (for the class Positive-Displacement-Pump) placed upon workspace 1029 and of which object 1025 is an instance, a class definition 1035 (for the class Pump, which is the superior class to the class Positive-Displacement Pump) placed upon workspace 1010, and a class definition 1040 (for the class Process-Equipment, which is the superior class to the class Pump) placed upon workspace 1020. In the example of FIG. 13B, the access restrictions would be read in the order shown by following the arrows 1026A, 1026B, 1026C, 1026D, 1026E, 1026F, 1026G, i.e., first one would read the user restrictions for the table for object 1025, then one would read the user restrictions in the table for subworkspace 1020, next one would read the user restrictions in the table for item 1015, then one would read the user restrictions in the table for workspace 1010, then one would read the user restrictions in the kb-restrictions table, next one would read the class restrictions in the table for class definition 1030, then one would read the class restrictions in the table for class definition 1035, and finally one would read the class restrictions in the table for class definition 1040.

Figure 13C:
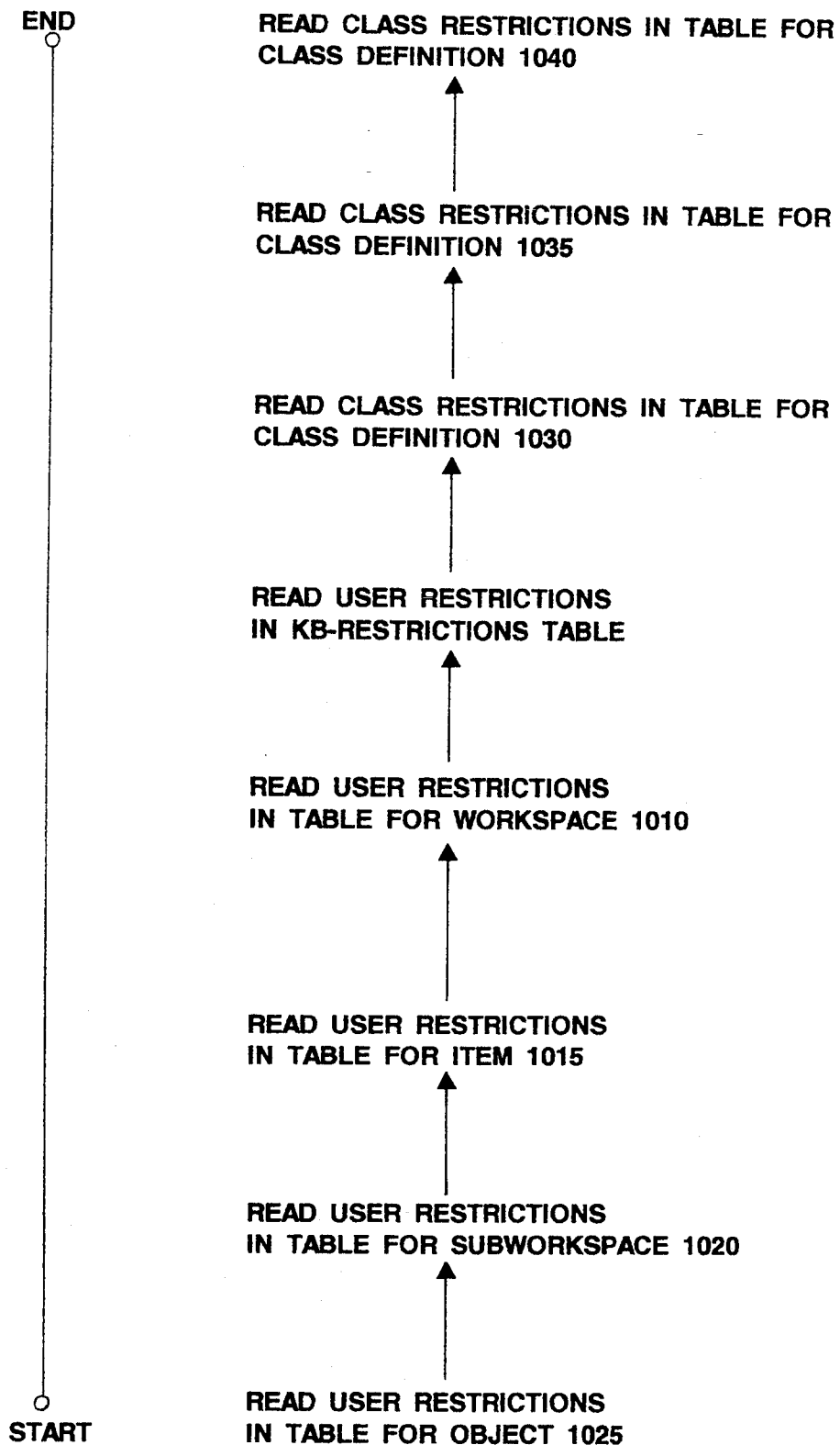

See also FIG. 13C, which shows a schematic flow chart illustrating the order in which access restrictions would be read for the example shown in FIG. 13B.

Figure 13D:
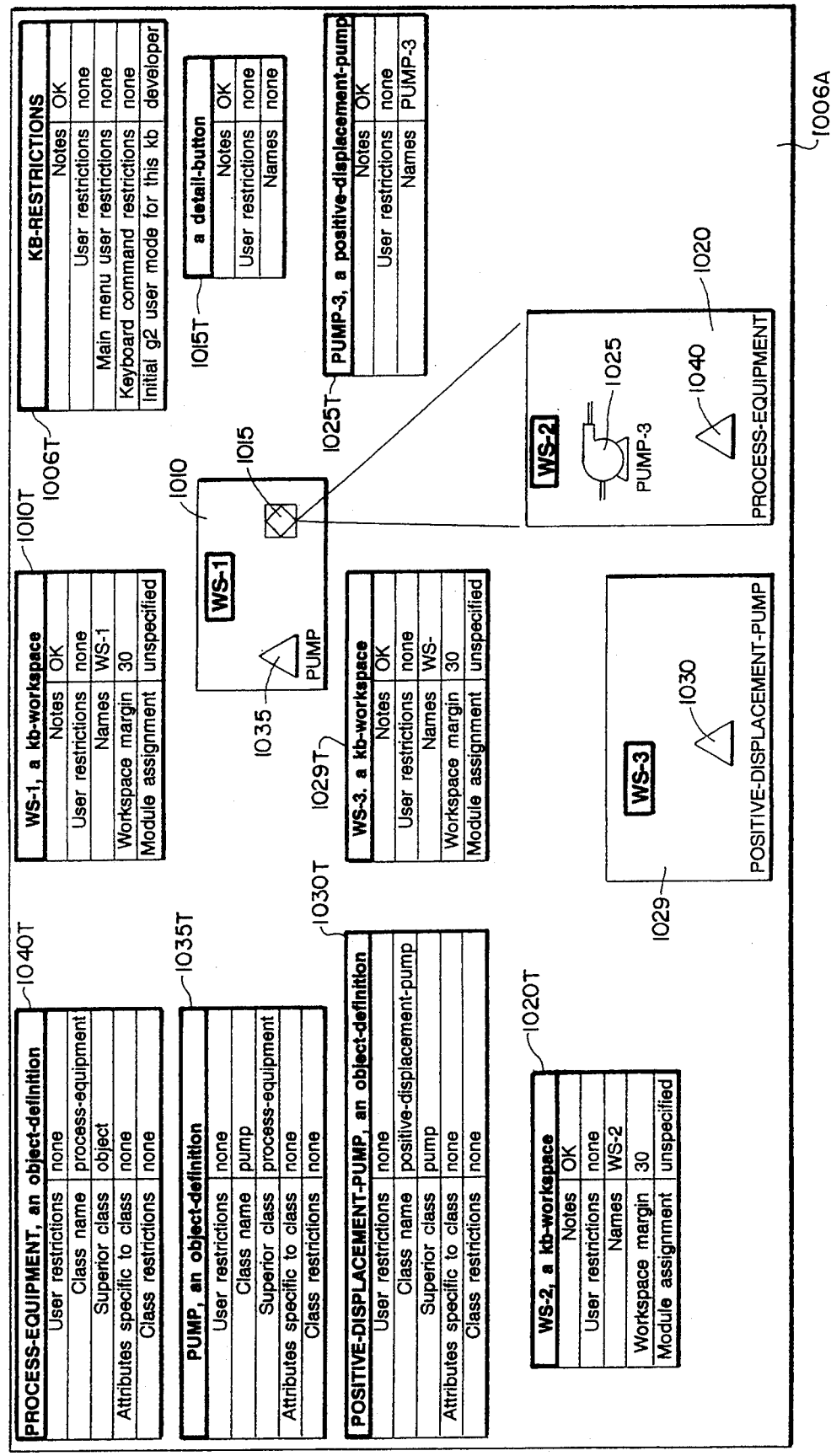

FIG. 13D shows a related screen display 1006A for the same example, where top-level workspace 1010, item 1015, workspace 1020, object 1025, workspace 1029, class definition 1030, class definition 1035 and class definition 1040 are shown, as well as the attribute table 1040T for class definition 1040, the attribute table 1035T for class definition 1035, the attribute table 1030T for attribute 1030, the attribute table 1029T for workspace 1029, the attribute table 1025T for object 1025, the attribute table 1020T for the workspace 1020, the attribute table 1015T for the item 1015, the attribute table 1010T for the workspace 1010, and the kb-restrictions table 1006T for the application running on screen displays 1006 and 1006A.

Thus it will be seen that when reading access restrictions in G2 Ver. 3.0, precedence is given to the workspace hierarchy over the class hierarchy.

It will be appreciated that the access restriction clauses which follow the mode filters must be carefully analyzed to determine thier effect. It will also be appreciated that in G2 Ver. 3.0 these access restriction clauses can be defined by the new class restrictions as well as by the traditional user restrictions previously discussed. Thus it is appropriate to review the manner in which access restriction clauses are implemented in G2 Ver. 3.0 when class restrictions are involved.

The information available with which to conduct the access restriction search is the following:
  the user mode of the user's window;
  the item;
  the set of menu choices applicable to the item in the absence of any access restrictions;
  the path up the workspace hierarchy starting with the item and ending with a top level workspace, and the user restrictions, if any, in each of these items;
  the restrictions in kb-restrictions;

the path up the class hierarchy, starting with the immediate class of the item, the class definitions for each of these classes to the extent that they are user defined, and the class restrictions, if any, in these definitions.

Using the previous example of analyzing the effect of access restrictions that involve menu choices and selection upon clicking, the access restriction search proceeds in this manner:

- the access restrictions are read in the order previously described—each group of access restrictions has a mode filter, and the group is ignored unless the mode filter indicates that the group applies based upon the user mode;
- only clauses that begin with menu choices for or selecting any . . . implies are applicable in this context (other clauses apply to non-selecting gestures, and to table display and interaction)—the rest are ignored;
- only access restriction clauses that apply to a class that the item is a member of are applicable, the rest are ignored (i.e., the class or classes listed near the beginning of the access restriction clause must contain at least one class in the class inheritance path of the item);
- the search must end either with a subset of the original menu choices with which to build the menu, or with the decision to execute one of them without displaying a menu, or with no action;
- a menu choice will be executed rather than a menu being displayed if a clause containing selecting any . . . implies is read on the search before a clause containing exclude or include but without additionally is encountered;
- if there is no such selecting any clause, then the menu choices must be filtered—the following describes the filter as applying to a single choice from among the set of menu choices that would have appeared absent any access restrictions, however, the actual search is done for the entire group so as to be efficient:
- include—if the choice is not listed, it is not included, and the search is over; if the choice is listed, it is included and the search is over;
- include additionally—if the choice is not listed, the search continues; if the choice is listed, it is included and the search is over;
- exclude—if the choice is listed, it is not included and the search is over; if the choice is not listed, it is included and the choice is over;
- exclude additionally—if the choice is listed, it is not included and the search is over; if the choice is not listed, the search continues;
- if the search ends with no decision, the menu choice is included.

As noted previously, it is frequently easier to understand the logic of how access restrictions work if one considers how they read in English in top down order. To do this, read them starting with the class restrictions in the most general class, continuing down the class hierarchy to those in the most specific class, then read the kb-restrictions, and then read the user restrictions starting with those in the top level workspace and descending the workspace hierarchy, ending with the user restrictions in the item toward which the user's gesture is made.

It is important to appreciate that the class restriction construct is implemented in G2 Ver. 3.0 so that when it is used in conjunction with the aforementioned proprietary mode construct, the following will be true. A group of access restriction clauses preceded by the filter when in proprietary mode will be acted upon (rather than rejected) if either (i) the item towards which the gesture is made is or lies beneath a proprietary workspace, or (ii) the group of access restriction clauses are within a class restriction, and the class restriction lies within a definition placed upon a proprietary workspace.

2.4 Additional Considerations

By using class restrictions combined with the proprietary mode construct, a vendor can be fairly certain that information placed inside a vendor-created workspace will remain confidential. More specifically, so long as the vendor places the class definition inside a vendor-created workspace, and hides the attributes of that class with class restrictions placed in that workspace, and the vendor then makes that workspace proprietary, a user—even an administrator—cannot thereafter access the hidden attributes inside the proprietary workspace (since this region has been made proprietary and hence access restrictions apply against all users, including administrators) or inside a non-proprietary workspace (since the class restrictions which hide the object attributes are inherited into the non-proprietary workspace along with the object).

See, for example, FIG. 14, which shows a G2 Ver. 3.0 screen display 375. Display 375 comprises a vendor-created workspace 380 having a vendor-created class definition 385 thereon, and a user-created workspace 390 having an object 395 thereon, where object 395 is an instance of the class represented by class definition 385. In this example, the attributes of class definition 385 have been hidden by appropriate class restrictions, which are diagrammatically represented by the dashed-dotted line 400 which has been placed around class definition 385. Since these restrictions are class restrictions, they flow through the class hierarchy so as to apply to object 395 as well as to the class definition 385. These class restrictions cause the attributes of object 395 in the user-created workspace 390 to be hidden as well, as diagrammatically indicated by the dashed-dotted line 400 which also surrounds object 395. It is to be appreciated that if the class restrictions are intended to apply even to administrators, they must make use of the proprietary mode construct discussed above, i.e., the class restrictions must include the appropriate proprietary mode filter and workspace 380 must be made proprietary. Workspace 380 is shown to be proprietary in FIG. 14 by virtue of the dashed line 405 which has been placed around the workspace.

Thus it will be seen that the combination of appropriately placed class restrictions and the proprietary mode construct can create a powerful tool which can be used by a vendor to inhibit access to the contents of a vendor-created workspace. Unfortunately, however, these two constructs alone may not be able to completely close off the contents of a vendor-created workspace in certain situations.

More particulary, it has been found that if a user can learn the name of the attribute that the vendor has restricted from view, or if the user can by inference guess the name of that attribute, the user can then write a new access restriction which will reverse the vendor-created access restriction and thereby restore access to the desired attribute. In this respect it will be recalled that one of the cornerstones of the access restriction system of G2 Ver. 2.11B (and, except as will hereinafter be discussed with respect to the new absolutely access restriction clause construct of the present invention, of G2 Ver. 3.0) is the ability to reverse, at a lower level, a general rule written at a higher level. This feature is provided so as to permit the desired level of refinement to be achieved in the access restriction process. However, in the case described above, it also permits the user to reverse, in a lower level of the class hierarchy, a class restriction written in a higher level of the class hierarchy. As a result, the aforementioned technique of (i) placing the class definition inside a workspace, (ii) hiding the attributes of that class with class restrictions placed in that workspace, and (iii) then making that workspace proprietary, can be overcome where the user can identify (and hence thereafter restore) the attributes which have been restricted.

Accordingly, an additional new construct is provided by the present invention to close off this last access door.

3. The Absolutely Access Restriction Clause Construct 3.1 Overview

In order to provide a means by which an access restriction written at a higher level of the workspace hierarchy or the class hierarchy can be prevented from being reversed at a lower level of the workspace hierarchy or the class hierarchy, a new absolutely access restriction clause construct has now been implemented in the access restriction system of G2 Ver. 3.0. As will hereinafter be discussed in further detail, the use of this new absolutely restriction clause construct permits an access restriction appearing in user restrictions and class restrictions to be made absolute, so that it cannot thereafter be overridden at a lower level.

3.2 Design Considerations

The implementation of the new absolutely access restriction clause construct of G2 Ver. 3.0 has required several significant creative steps.

First, it should be recognized that the idea of making an access restriction absolute is somewhat contrary to the original concept of the access restriction system itself. More particularly, historically, one of the fundamental strengths of the access restriction system of G2 Ver. 2.11B has been the ability to undo, at a lower level, an access restriction created at a higher level. As discussed above, this feature has traditionally been desired so as to permit the required level of refinement to be achieved in the access restriction process. Thus, the creation of the new absolutely access restriction clause construct is somewhat counterintuitive when considered in the context of the access restriction system of G2 Ver. 211B.

Second, the importance of the new absolutely access restriction clause construct only becomes apparent when one encounters the problem discussed above, i.e., where the vendor tries to close off access to certain information by placing a class definition inside a workspace, hiding the attributes of that class definition with class restrictions placed in that workspace, and then making that workspace proprietary, and where the user then identifies (and subsequently restores) the attributes which have been restricted by the vendor. It is really only in this context that the importance of the new absolutely access restriction clause construct becomes apparent. In other words, the significance of the absolutely access restriction clause construct can only be appreciated when one understands the goal which it is intended to help achieve.

3.3 Implementation

It will be recalled that in G2 Ver. 2.11B, user restrictions consist of .mode filters followed by user restriction clauses, where the mode filters are in the form:

when in <mode or modes>: . . .

unless in <mode or modes>: . . .

and where the restriction clauses that follow the mode filters each have one of the following sets of words within the clause:

includes includes additionally excludes excludes additionally implies

With the introduction of the absolutely access restriction clause construct in G2 Ver. 3.0, the access restriction clauses that follow the mode filters (in both user restrictions and class restrictions) can now have one of the following expanded sets of words within the clause:

includes includes additionally excludes excludes additionally excludes absolutely implies implies absolutely Thus it will be seen that with the user restriction clauses and the class restriction clauses of G2 Ver. 3.0, five different kinds of restriction clauses now exist:

--- menu choices for <class or classes>
{include [additionally} | exclude [additionally |
absolutely]}: <menu choices>
non-menu choices for <class or classes>
{include [additionally]} | exclude [additionally |
absolutely]}: <non-menu choices>
selecting any <class or classes> [absolutely]
implies <menu choice>
attributes visible for <class or classes>
{include [additionally] | exclude [additionally |
absolutely]}: <attributes names>
table menu choices for [the attribute names of] any
<class or classes> {include [additionally] |
exclude [additionally | absolutely]}: <table menu
choices>

---

The presence of the term absolutely in a user restriction clause or a class restriction clause has the effect that the access restriction cannot thereafter be reversed by an opposite access restriction located so as to be encountered later in the access restriction search procedure.

The effect of the absolutely access restriction clause construct will now be described in the context of access restriction clauses that involve menu choices and selection upon clicking. The behavior of the absolutely access restriction clause construct on the other restriction clauses is similar in principle and follow from an understanding of the former.

The access restriction clauses that involve menu choices and selection upon clicking have the following grammar:

--- menu choices for <classes or classes> [include |
include additionally | exclude | exclude
additionally | exlude absolutely] :
<menu choices or choices>
selecting any <class of classes> [absolutely]

-continued

| implies: <menu choice> |

Restriction clauses of this type are applicable when the user clicks on an item. In the absence of restrictions, G2 Ver. 3.0 would display a menu for the item on the user's window. The restrictions modify this so that either the menu appears but with some of its choices removed, or one of the choices is executed without displaying the menu.

The information available with which to conduct the access restriction search is the following:
- the user mode of the user's window;
- the item;
- the set of menu choices applicable to the item in the absence of any access restrictions;
- the path up the workspace hierarchy starting with the item and ending with a top level workspace, and the user restrictions, if any, in each of these items;
- the restrictions in kb-restrictions
- the path up the class hierarchy, starting with the immediate class of the item, the class definitions for each of these classes to the extent that they are user defined, and the class restrictions, if any, in these definitions.

The search proceeds in this manner:
- the access restrictions are read in the order previously described—each group of access restrictions has a mode filter, and the group is ignored unless the mode filter indicates that the group applies based upon the user mode;
- only clauses that begin with menu choices for or selecting any . . . implies are applicable in this context (other clauses apply to non-selecting gestures, and to table display and interaction)—the rest are ignored;
- only access restriction clauses that apply to a class that the item is a member of are applicable, the rest are ignored (i.e., the class or classes listed near the beginning of the access restriction clause must contain at least one class in the class inheritance path of the item);
- the search must end either with a subset of the original menu choices with which to build the menu, or with the decision to execute one of them without displaying a menu, or with no action;
- a menu choice will be executed rather than a menu being displayed if (i) a clause containing selecting any . . . absolutely implies is read anywhere in the search, or (ii) a clause containing selecting any . . . implies is read on the search before a clause containing exclude or include (but without additionally or absolutely) is encountered;
  - clauses containing absolutely cannot be overridden; if there is more than one selecting any . . . absolutely implies clause, or if such a clause specifies a menu choice that is elsewhere absolutely prohibited, then nothing happens;
- if there is no such selecting any clause, then the menu choices must be filtered—the following describes the filter as applying to a single choice from among the set of menu choices that would have appeared absent any access restrictions, however, the actual search is done for the entire group so as to be efficient:
  - include—if the choice is not listed, it is not included, and the search is over; if the choice is listed, it is included, unless it is excluded absolutely elsewhere;
  - include additionally—if the choice is not listed, the search continues; if the choice is listed, it is included, unless it is excluded absolutely elsewhere;
  - exclude—if the choice is listed, it is not included and the search is over; if the choice is not listed, it is included, unless it is excluded absolutely elsewhere;
  - exclude additionally—if the choice is listed, it is not included and the search is over; if the choice is not listed, the search continues;
  - exclude absolutely—if the choice is listed, it is not included regardless of any other inclusion in any other position and the search is over; if the choice is not listed, the search continues;
  - if the search ends with no decision, the menu choice is included.

As noted previously, it is frequently easier to understand the logic of how access restrictions work if one considers how they read in English in top down order. To do this, read them starting with the class restrictions in the most general class, continuing down the class hierarchy to those in the most specific class, then read the kb-restrictions, and then read the user restrictions starting with those in the top level workspace and descending the workspace hierarchy, ending with the user restrictions in the item toward which the user's gesture is made.

Access restrictions beginning with menu choices for . . . include: are intended to furnish a complete specification of included menu choices for the listed classes, with the presumption that all others are excluded. It is a general declaration, and overrules any statement made at a higher level. But it may have exceptions at a lower level.

Access restrictions beginning with menu choices for . . . exclude: are similar in scope, but complimentary in that they furnish a complete specification by listing all menu choices that are to be excluded, with the presumption that all others are included.

Access restrictions of the form menu choices for . . . include additionally and menu choices for . . . exclude additionally are intended to modify the specification inherited from a higher level by including or excluding some more menu choices respectively. These declarations make no assumption about menu choices they do not specifically mention.

Access restrictions beginning with selecting any . . . implies are intended to override menu choices generally, and to replace them with the execution of a single action. A selecting any restriction at a higher level can be overridden by one at a lower level.

Access restrictions containing the absolutely construct are an exception to the principle that a lower level restriction overrides a higher level one. These restrictions are particularly useful for increasing the power of encapsulation of class definitions. They can be used in class restrictions to create behavior on classes of items that cannot be overridden, either by restrictions on subclasses or by restrictions in the locality where instances are placed. This has proven to be particularly useful in closing off access to portions of application programs to end users.

It should be appreciated that the term absolutely appears in access restrictions that exclude or select, but not those that include. Any contradiction between access restrictions containing absolutely results in no activity at all. This can only happen if there is more than one menu choice that is selected absolutely, or if a menu choice is both excluded absolutely and selected absolutely.

The absolutely restriction construct can be combined with the proprietary mode construct to lock a section of a knowledge base. More specifically, if a workspace is proprietary, and if the user-restrictions attribute on its table contains the restriction:

```
when in proprietary mode:
    attributes visible for item exclude absolutely:
        attribute-x;
    table menu choices for the attribute-y of
        any item exclude absolutely: edit
``` then no user restrictions in the portion of the workspace hierarchy rooted in that workspace can be visible or edited by any user, even a system administrator. In this manner, an entire section of a knowledge base can be locked so that a user cannot view or modify any of the programmatic components on it.

While it is the combination of the new proprietary mode construct and access restrictions with absolutely that make it possible to lock a section of a knowledge base, it is the use of class restrictions with absolutely that make it possible to encapsulate behavior into a class that cannot be reversed. The combination of all three constructs makes it possible to encapsulate behavior for a class of objects that locks the appearance or behavior of the object regardless of where it is placed and against all types of users. Take, for example, the restriction:

```
when in proprietary mode: attributes visible
    for plant-equipment exclude absolutely:
        financial-data
```

If this restriction is placed in the class-restrictions attribute of the object definition of plant-equipment, and if this object definition is placed upon a proprietary workspace that has been restricted as described above, this restriction itself may not be modified or removed or reversed at a lower level, and it will apply to all instances of the class regardless of where they are located.

4. Illustrative Software Code

Attached hereto as Appendix A is a representative example of software code which can be used to implement the present invention.

MODIFICATIONS OF THE PREFERRED EMBODIMENT

In the preferred embodiment of the invention, the new access restriction system includes the new proprietary mode construct, the new class restriction construct and the new absolutely access restriction clause construct, all provided in combination with the prior art access restriction system of G2 Ver. 2.11B. This is the form of the invention which has been implemented in G2 Ver. 3.0. Of course, it should also be appreciated that in another possible form, the invention can constitute only the new proprietary mode construct provided in combination with the prior art access restriction system of G2 Ver. 2.11B; or the invention can constitute only the new class restrictions provided in combination with the prior art restriction system of G2 Ver. 2.11B; or the invention can constitute only the new absolutely access restriction clause construct provided in combination with the prior art access restriction system of G2 Ver. 2.11B; or the invention can constitute any combination of the foregoing.

Furthermore, in the foregoing description of the invention, the new proprietary mode construct, the new class restrictions, and the new absolutely access restriction clause construct have all been discussed in the context of how they expand the prior art access restriction system of G2 Ver 2.11B and have been implemented in the new access restriction system of G2 Ver. 3.0. However, it is also to be appreciated that the new proprietary mode construct, the new class restrictions, and the new absolutely access restriction clause construct can all be incorporated, either alone or in combination with one another, in an access restriction system other than the one embodied in G2 Ver. 2.11B. In particular, the new proprietary mode construct, the new class restrictions and the new absolutely access restriction clause construct can all be incorporated, either alone or in combination with one another, in an access restriction system of the type comprising (a) workspaces, workspace hierarchies and inheritance of properties through the workspace hierachy; (b) classes, class hierarchies and inheritance of properties through the class hierarchy; (c) a system of user restrictions which flow through the workspace hierarchy; and (d) a system of class restrictions which flow through the class hierarchy. Indeed, it should also be appreciated that the new proprietary mode construct and the new absolutely access restriction clause construct can both be incorporated, either alone or in combination with one another, in an access restriction system of the type comprising (a) workspaces, workspace hierarchies and inheritance of properties through the workspace hierarchy; and (b) a system of user restrictions which flow through the workspace hierarchy.

Furthermore, in the foregoing description of the invention, the new proprietary mode construct, the new class restrictions, and the new absolutely access restriction clause construct have all been discussed in the context of G2 Ver. 2.11B and G2 Ver. 3.0, which have a particular style to thier graphical user interface. Thus, for example, when one clicks on an item in G2 Ver. 2.11B or G2 Ver. 3.0, the menu for that item appears, and when a menu choice for that item is "excluded" from a user, that menu choice no longer appears in the menu. In other operating environments, however, different graphical user interfaces may be used.

Thus, for example, in some alternative operating environments, the user first selects an object for action, and then clicks on a menu bar to cause a pull-down menu to appear. In some of these systems, a menu choice which has been excluded may be left visible on the menu, but it will be visually marked in some manner so as to advise the user that the menu choice is not selectable (e.g. the excluded menu choice may be "greyed out" while the active menu choices remain in full and normal contrast).

In addition to the foregoing, in some operating environments the user may be able to select multiple objects for action before clicking on the menu bar to cause a pull-down menu to appear. In operating environments of this type, several different conventions may be used to handle the situation where a menu choice should be excluded for some but not all of the selected objects. More particularly, according to one convention, the pull-down menu may have the menu choice "greyed out" if that menu choice should be excluded for any one of the objects selected. Alternatively, according to another convention, all of the menu choices may appear in full and normal contrast even if a menu choice should be excluded for at least one of the objects selected; however, subsequent clicking on that menu choice will result in either no action happening for all of the selected objects, or no action happening for the object where the menu choice should be excluded.

The present invention is equally applicable to all of the foregoing operating environments. In this respect it should be appreciated that the present invention is intended to provide a means for configuring a user interface according to a system of access restrictions, and it is not necessarily intended to be tied to a particular operating environment or to a particular graphical user interface. In fact, the access restriction system of the present invention can be utilized to configure the user interface for substantially any operating environment or substantially any graphical user interface.

ADVANTAGES OF THE INVENTION

Numerous advantages are obtained by practicing the present invention.

For one thing, the present invention provides suitable means by which end user administrators can be quickly, easily and effectively barred from gaining any access to vendor-created workspaces.

For another thing, the present invention provides an improved access restriction system which can be used to configure a user interface and to make an application secure.

And the present invention provides an access restriction system which is based on, and improves upon, the access restriction system provided in G2 Ver. 2.11B.

Also, the present invention provides an access restriction system which is a superset of the access restriction system provided in G2 Ver. 2.11B, whereby the access restriction system of G2 Ver. 2.11B will remain fully available to a user of the present invention.

Furthermore, the present invention provides a novel method for configuring a user interface.

APPENDIX A

```
;;;; Utilities for Functions To Compute Restrictions

;;; When computing what choices are available a search is made up the
;;; user restrictions. As this search proceeds it accumulates those
;;; choices that the restriction have excluded or included into two sets.
;;; These are known as the prohibited and permitted sets. The function
;;; 'compute-new-restriction-set' implements the fundamental operation
;;; on this set.

;;; The routines 'g2-subset', 'g2-set-equivalent', 'g2-equiv',
;;; and 'g2-xor' are defined here and used though out G2.

;;; Global operations, i.e. keyboard and main menu, need only search
;;; their respective slot in the kb-restrictions system table.
;;; 'Compute-user-restrictions-in-kb-restrictions' provides a general
;;; utility for doing just that.

;;; Other operations must search the KB hierarchy beginning at the item the user is about
;;; to operate upon. The general utility for this is provide by three components while
;;; each kind of operation must provide two components.
;;;    - routine to compute some kind of restriction on items
;;;    - 'with-filters', a macro, establishes a dynamic extent
;;;    - 'filter-restrictions-for-item' mapping function of the restrictions
;;;    - function to apply to each restriction encountered.
;;;    - 'filter-new-restriction-set' is usually called by function applied to each restriction.

;;; Permission functions have values which may have filter conses. These
;;; should be reclaimed by the caller. Most of them return two values: a list
;;; of menu choices, for example, and either true if those choices are permitted
;;; or nil if those choices are not permitted.

(defconser filter)

(defun reclaim-filter-list-function (list)
   (reclaim-filter-list-macro list))

;; Needed in MENUS

;;; 'frame-has-class-p' decides whether a frame is of a class
;;; matching a list of classes given in a restriction clause.
;;; It would be the same as frame-of-class-p except that here ANY
;;; frame is considered to be of class 'item'.

(defun frame-has-class-p (frame list)
   (loop for class in list
         thereis (or (eq class 'item)
                     (frame-of-class-p frame class))))
```

```
;; Called by filter-workspace-menu-restriction, filter-visibility-restrictions,
;; filter-table-restrictions, and filter-non-menu-restriction in this module.

;;; Compute-new-restriction-set has as value a set which is:
;;;
;;;    old-set U (additions - complement-set)
;;;
;;; where "U" is set union, and "-" is set difference.

;;; Sets are represented as filter lists and are assumed to be without
;;; duplicates. Furthermore, it is assumed that the arguments additions and
;;; complement-set are disjoint. The value is then guaranteed to be
;;; without duplicates, and also is disjoint from complement-set.
;;; The elements of a set are symbols, and equality is "eq".
;;; The second and third arguments are not mutated. The first argument may be
;;; mutated if not null, by having new stuff nconced at the end.

;;; All of the above is optimized for this situation, and probably not worth
;;; turning into a utility.

(defun-simple compute-new-restriction-set
       (old-set additions complement-set-1 complement-set-2)
  (loop for element in additions
        unless (or (memq element complement-set-1)
                   (memq element complement-set-2)
                   (memq element old-set))
          collect element into new-stuff using filter-cons
        finally (return (nconc old-set new-stuff))))

;;; 'Remove-from-restriction-set' is a two argument function equivalent to
;;; nset-difference except that it works in filter conses.

(defun-simple remove-from-restriction-set (set removals)
  (loop for element in removals do
    (setq set (delete-filter-element element set))
    finally (return set)))

;; Consider generalizing the following as a utility. If so, make these names
;; better, and consider (then) making them macros if they have to be fast.

(defun g2-xor (x y) (if x (not y) y))

(defun g2-equiv (x y) (if x y (not y)))

(defun g2-set-equivalent (s1 s2)
  (and (g2-subset s1 s2) (g2-subset s2 s1)))

(defun g2-subset (small-set large-set)
  (loop for elt in small-set always (memq elt large-set)))

;;; 'With-filters', a macro, creates a dynamic extent.  To simplify the
;;; following discussion of N variables bound the term "choice" should be
;;; read to mean "choice or attribute name."
;;;   - permitted-restriction-set
;;;     Choices from "include" and "include additionally" restrictions are accumulated
;;;     here until a definitive restriction is encountered.
;;;   - prohibited-restriction-set,
;;;     Choices from "exclude" and "exclude additionally" restrictions are accumulated
;;;     here until a definitive restriction is encountered.
;;;   - conditional-termination-state?
;;;     This provides a flag indicating if a definitive restriction has been encountered.
;;;     - 'NIL indicates we are still searching for a definitive restriction.
;;;     - 'PERMITTED and 'PROHIBITED indicates we have seen a definitive choice restriction.
;;;     - 'IS-VISIBLE and 'IS-NOT-VISIBLE indicates we have seen a definitive choice restriction.
;;;     A non-NIL value flags that we have seed a definitive restrictions.
;;;   - absolutely-prohibited-restriction-set
;;;     Choices from "exclude absolute" restrictions are accumulated here.
;;;     These then mask any "include" or "include additionally" restrictions
;;;     encountered later.
;;;   - absolutely-selected-choice?
;;;     Any "select ... absolutely ..." choice is stored here.
;;;   - conditional-selected-choice?
;;;     Any other "select ..." choice is stored here.

;;; This is always established in preparation for calling the mapping fuction
;;; filter-restrictions-for-item and so current-g2-user-mode? should be non NIL.

;;; You may return multiple values from with-filters, and filter-restrictions-for-item
;;; usually does.

(defvar permitted-restriction-set)
(defvar prohibited-restriction-set)
(defvar absolutely-prohibited-restriction-set)
```

```
(defvar absolutely-selected-choice?)
(defvar conditional-selected-choice?)
(defvar conditional-termination-state?)

(defmacro with-filters (&body body)
  '(let* ((permitted-restriction-set nil)
          (prohibited-restriction-set nil)
          (absolutely-prohibited-restriction-set nil)
          (absolutely-selected-choice? nil)
          (conditional-selected-choice? nil)
          (conditional-termination-state? nil))
     . ,body))

(defun reclaim-permitted-restriction-set ()
  (reclaim-filter-list permitted-restriction-set)
  (setq permitted-restriction-set nil))

(defun reclaim-prohibited-restriction-set ()
  (reclaim-filter-list prohibited-restriction-set)
  (setq prohibited-restriction-set nil))

(defun-simple reclaim-absolutely-prohibited-restriction-set ()
  (reclaim-filter-list absolutely-prohibited-restriction-set)
  (setq absolutely-prohibited-restriction-set nil))

;;; Superior-frame returns either (a) the superblock of frame, if frame is a subblock,
;;; (b) the parent of frame, if frame is a variable used for an attribute or a subworkspace,
;;; or (c) the superblock of the input end object of the connection for frame, if frame is
;;; a connection frame. It is not coded for maximal speed.

(defun-simple superior-frame (frame)
  (or
    (if (frame-of-class-p frame 'block)
        (or (superblock? frame)
            (parent-frame frame)))
    (if (workspace-p frame)
        (parent-of-subworkspace? frame))
    (if (frame-of-class-p frame 'connection)
        (superblock? (input-end-object
                       (connection-for-this-connection-frame frame))))
    (if (frame-of-class-p frame 'simulation-subtable)
        (parent-variable frame))

))

;;; 'Step-up-user-restrictions-hierarchy' is a macro used in loops that walk the
;;; KB Hierarchy. It returns the next item in the hierarchy. A second argument
;;; is a lexical variable used to indicate if we are walking the KB or the Class
;;; hierarchy. The third argument is the original-item we are traversing from.

(defmacro step-up-user-restrictions-hierarchy (location traversing-class-hierarchy? original-item)
  ;; Entrance constraints to the form below:
  ;; (1) original-item is a frame;
  ;; (2) traversing-class-hierarchy? is true iff item? is user defined, and
  ;;      location is a definition frame for some class in the inheritance of
  ;;      original-item,
  ;; (3) location is a frame.
  ;; This form has as value the next frame to be searched for restrictions
  ;; or nil if the search is complete.
  '(cond
     (,traversing-class-hierarchy?
       (setq templ
             (class-definition (superior-of-defined-class ,location)))
       (cond
         ((class-definition-is-frame-p templ)
          ;; Get the next user definition in the inheritance path
          templ)
         ;; else the search is complete.
         (t nil)))

((eq ,location kb-restrictions)
      (cond
        ((class-of-frame-is-user-defined-p original-item)
         ;; start to search the class hierarchy
         (setq ,traversing-class-hierarchy? t)
         (class-definition (class ,original-item)))
        (t
         ;; if not user defined, search is complete.
         nil)))

;; location is somewhere in the positional hierarcy of item.
     ((setq templ (superior-frame ,location))
      ;; Get the superior frame positionally
      templ)
     ;; if no more, get the the kb-restrictions.
     (t kb-restrictions)))
```

```
;;; 'Filter-new-restriction-set' is called only within the dynamic extent
;;; established by with-filters.  It always called by the function F being mapped
;;; over the user restrictions by filter-restrictions-for-item.  It side effects
;;; most of the state established by with-filters, for example it sets
;;; conditional-termination-state?  when it encounters a definitive restriction.

;;; It accumulates, as appropriate, choices into prohibited-restriction-set and
;;; permitted-restriction-set choices until it encounters a definitive restriction.

;;; It processes absolute restrictions by updating the
;;; absolutely-prohibited-restriction-set and refining the prohibited and
;;; permitted restriction sets.

(defun-simple filter-new-restriction-set (restriction-type additions)
  (case restriction-type
    ((include include-additionally)
     (setq permitted-restriction-set
           (compute-new-restriction-set
             permitted-restriction-set
             additions
             prohibited-restriction-set
             absolutely-prohibited-restriction-set))
     (if (eq restriction-type 'include)
         (setq conditional-termination-state? 'permitted)))
    ((exclude exclude-additionally)           ; otherwise case?
     (setq prohibited-restriction-set
           (compute-new-restriction-set
             prohibited-restriction-set
             additions
             permitted-restriction-set nil))
     (if (eq restriction-type 'exclude)
         (setq conditional-termination-state? 'prohibited)))
    (exclude-absolutely
     (setq absolutely-prohibited-restriction-set
           (compute-new-restriction-set
             absolutely-prohibited-restriction-set
             additions nil nil))
     (setq permitted-restriction-set
           (remove-from-restriction-set permitted-restriction-set additions))
     (setq prohibited-restriction-set
           (compute-new-restriction-set
             prohibited-restriction-set
             additions permitted-restriction-set
             nil))))
  nil)

;; Called by filter-workspace-menu-restriction, filter-table-restrictions,
;; and filter-non-menu-restriction in this module, but not by filter-visibility-restrictions.

;;;; Interface Into User Restrictions

;;; Most of the external interface for asking questions of user restrictions are defined
;;; in this section.
;;; These two implement the global restrictions
;;;     compute-main-menu-restrictions
;;;     compute-global-keyboard-command-restrictions
;;; These four implement restrictions on items in the KB hierarchy.
;;;     compute-menu-restrictions-for-click-on-workspace
;;;     compute-menu-restrictions-for-click-on-table
;;;     compute-non-menu-restrictions-for-item
;;;     include-slot-in-attribute-table-p
;;; also
;;;     non-menu-choice-permitted-p ;;; The four routines that query restrictions for items in the KB hierarchy
;;; each have an associated mapping function they apply to restrictions
;;; using filter-restrictions-for-item.  These each immediately follow the
;;; four routines.

;;; Compute-main-menu-restrictions has as values (1) a list either of permitted
;;; or prohibited main menu (and its tributaries) choices. The second argument is
;;; true (non-nil) in the first case, and nil in the second case. If there are no
;;; restrictions, then the function return the empty list of prohibited choices and nil.
;;; As with all the following functions that return such lists, the list is of
;;; filter-conses and must be reclaimed.
```

```
(defun compute-main-menu-restrictions ()
  (compute-user-restrictions-in-kb-restrictions
    (main-menu-user-restrictions kb-restrictions)))

(defvar choice-conflict (list 'choice-conflict))

;;; 'Compute-menu-restrictions-for-click-on-workspace' (See documentation for
;;; compute- main-menu-restrictions.) These are the menus that appear when you
;;; click on a workspace or any item on a workspace.

(defun-simple filter-workspace-menu-restriction (restriction-clause item)
    (let* ((activity-type                                    ; better name? use elsewhere?
             (first restriction-clause)))
       (when (frame-has-class-p item (second restriction-clause))
          (case activity-type
             (workspace-menu
                (filter-new-restriction-set
                   (third restriction-clause)
                   (cdddr restriction-clause)))
             (selecting
                (setq conditional-selected-choice? (third restriction-clause)))
             (selecting-absolutely
                (setq absolutely-selected-choice?
                      (if absolutely-selected-choice?
                          choice-conflict
                          (third restriction-clause))))))))
  nil)

;; Funcalled by filter-restrictions-for-item by request of
;; compute-menu-restrictions-for-click-on-workspace.

(defun compute-menu-restrictions-for-click-on-workspace (item)
  (with-filters
    (filter-restrictions-for-item
      item
      '(workspace-menu selecting selecting-absolutely)
      #'filter-workspace-menu-restriction nil)))

;; Called by make-table-describing-restrictions in this module.
;; Called by compute-choices-for-choice-computer in MENUS.

;;; 'Slot-name-for-restrictions' is bound in a dynamic extent established by
;;; include-slot-in-attribute-table-p for use by the function it maps over
;;; the restrictions.

;; probably ought to be "attribute-name-for-restrictions" - ben 1/06/92

(defvar slot-name-for-restrictions)

;;; 'Include-slot-in-attribute-table-p' is non-nil if the slot of the table for
;;; the given item ought to be displayed. It establishes a with-filters
;;; extent and maps 'filter-visibility-restrictions' over the visibility restrictions
;;; of the item passed. A second argument, an unaliased slot name, is bound to
;;; slot-name-for-restrictions.

;;; This does not need to be called in a for-workstation context, for example
;;; when displaying a file progress indicator. If servicing-workstations? is
;;; nil, this behaves as though the current user mode is ADMINISTATOR.

;;; This routine contains code to implement a number of exceptional cases.
;;; These arise in service of login, the ok objects, proprietary and the slot
;;; showing module assignment in workspaces.

;; And it needs one more to get the file progress indicator (and other things?)
;; to be visible even if restrictions are very extreme. - Ben 5/1/92 ??

(defun-simple filter-visibility-restrictions (restriction-clause item)
  (let* ((pseudo-class-list (second restriction-clause)))
     (when (frame-has-class-p item pseudo-class-list)
       (let* ((slot-names (third restriction-clause))
              (restriction-type (fourth restriction-clause))
              (slot-name-for-restrictions-included?
                 (memq slot-name-for-restrictions slot-names)))
         (case restriction-type
           ((include include-additionally)
            (cond
```

```
              (slot-name-for-restrictions-included?
              ;; conditionally visible
              (setq conditional-termination-state? 'is-visible)
              nil)
             (t (case restriction-type
                  (include
                   ;; not visible
                   (setq conditional-termination-state? 'is-not-visible)
                   t)
                  ;; no decision
                  (otherwise nil))))))

((exclude exclude-additionally exclude-absolutely)
         (cond
           (slot-name-for-restrictions-included?
            ;; not visible
            (setq conditional-termination-state? 'is-not-visible)
            t)
           (t (case restriction-type
                (exclude                       ; conditionally visible
                 (setq conditional-termination-state? 'is-visible)
                 nil)
                ;; no decision
                (otherwise nil))))))

)))))

;; Funcalled by filter-restrictions-for-item on request of include-slot-in-attribute-table-p.

;;; 'Include-slot-in-attribute-table-p' is documented above.

(defun include-slot-in-attribute-table-p (item slot-name-for-restrictions)
  (let ((current-g2-user-mode?            ; only workstation context
         (if servicing-workstation?       ;   var. to bind if necessary
             current-g2-user-mode?
             'administrator)))
    (cond
      ;; Implement the access "make-g2-secure" to only those
      ;; workstations that logged in as secure.
      ((and (eq slot-name-for-restrictions 'make-g2-secure?)
            (frame-of-class-p item 'ok))
       (and (g2-secure-p)
            (g2-user-in-this-workstation-has-backdoor-privileges?
             current-workstation)))
      ;; Assure that some built in classes used for progress
      ;; indicators are allowed to show their attributes inspite of
      ;; what the user might attempt to do.
      ((or (frame-of-class-p item 'file-progress)
           (frame-of-class-p item 'kb-search-state)
           (frame-of-class-p item 'icon-editor-table-info-frame))
       t)
      ;; Assure that user's security can't hide the login panel.
      ((frame-of-class-p item 'g2-login)
       t)
      (t
       (and
        ;; unless package-preparation-mode is true or (proprietary-p item)
        ;;   ("in proprietary mode"), do not show proprietary-package
        ;;   slot ...
        (or (not (eq slot-name-for-restrictions 'proprietary-package))
            package-preparation-mode
            (proprietary-p item))

;; The following is to maintain the constraint that the
        ;; module-this-is-part-of? slot of a kb workspace should not
        ;; be displayed in an attribute table unless it's a top-level
        ;; kb workspace.
        (or (not (frame-of-class-p item 'kb-workspace))
            (not (eq slot-name-for-restrictions
                     (alias-slot-name-if-necessary
                      'module-this-is-part-of?
                      'kb-workspace)))
            (null (parent-of-subworkspace? item)))

;; ... show slot only if permitted by normal user restrictions
        (with-filters
          (case (filter-restrictions-for-item
                 item '(visibility) #'filter-visibility-restrictions t)
            ((is-visible nil) t)
            ((is-not-visible nil)))))))))

;; Called by TABLES, and FACILITIES (for attribute displays).
;; Called by make-table-describing-restrictions in here.
```

```
;;; 'Compute-visible-slots-for-attribute-table' establishes a with-filters context and maps
;;; 'filter-attribute-visibility-restrictions' over the the visibility restrictions
;;; of the item passed.  Finally it returns the set of slot visible for this item??

(defun-simple filter-attribute-visibility-restrictions (restriction-clause item)
   (destructuring-bind ((nil pseudo-class-list . nil) restriction-clause)
      (when (frame-has-class-p item pseudo-class-list)
         (destructuring-bind ((nil nil slot-names restriction-type) restriction-clause)
            (filter-new-restriction-set
               restriction-type
               slot-names))))
  nil)

;;; 'Compute-visible-slots-for-attribute-table' is documented above.

(defun compute-visible-slots-for-attribute-table (item)
   (with-filters
      (filter-restrictions-for-item
         item '(visibility)
         #'filter-attribute-visibility-restrictions nil)))

;;; 'Compute-menu-restrictions-for-click-on-table', if given a slot name,
;;; provides restrictions for the menu when clicking on the slot.  With nil, it
;;; provides restrictions for clicking in any other area of the table.

;;; Compute-menu-restrictions-for-click-on-table establishes a with-filters context
;;; and binds slot-name-for-restrictions then maps filter-table-restrictions the
;;; restrictions of the item.
;;; Note that the assertion "the table menu for any ..." is taken to be valid
;;; anywhere on the table including any slot area, and the assertion "the table menu
;;; for the ... of any ..." makes an assertion about a given slot. When computing
;;; the restrictions for a slot, both types of assertion are examined.

;;; 'Filter-table-restrictions' is mapped over the table restrictions by
;;; compute-menu-restrictions-for-click-on-table. These restrictions
;;; are of the form: (table (pseudo-class*) (slots*) restriction-type choices*)

(defun-simple filter-table-restrictions (restriction-clause item)
   (when (and (frame-has-class-p item (second restriction-clause))
              (let ((slot-names (third restriction-clause)))
                 (or (null slot-names)
                     (and slot-name-for-restrictions
                          (memq slot-name-for-restrictions slot-names)))))
      (filter-new-restriction-set
         (fourth restriction-clause) (cddddr restriction-clause)))
   nil)

;; Funcalled indirectly by compute-menu-restrictions-for-click-on-table in here.

;;; 'Compute-menu-restrictions-for-click-on-table' is documented above.

(defun compute-menu-restrictions-for-click-on-table (item slot-name?)
   (with-filters
      (let* ((slot-name-for-restrictions slot-name?))
         (filter-restrictions-for-item
            item '(table) #'filter-table-restrictions nil))))

;; Called from compute-choices-for-choice-computer in MENUS.
;; Called from make-table-describing-restrictions in here.

;;; Compute-non-menu-restrictions-for-item takes an item and returns two
;;; values a list of choices and a flag indicating if they are permited
;;; or not.  It establishes a with-filters context and maps filter-non-menu-restrictions
;;; over the item's non-menu restrictions.

(defun-simple filter-non-menu-restriction (restriction-clause item)
   (when (frame-has-class-p item (second restriction-clause))
      (filter-new-restriction-set
         (third restriction-clause) (cdddr restriction-clause)))
   nil)

;; Funcalled via compute-non-menu-restrictions-for-item by filter-restrictions-for-item.

;;; 'Compute-non-menu-restrictions-for-item' is documented above.

(defun compute-non-menu-restrictions-for-item (item)
   (with-filters
      (filter-restrictions-for-item
         item '(non-menu) #'filter-non-menu-restriction nil)))
```

```
;; Called from handle-image-plane-event in RUN and in here by
;; make-table-describing-restrictions, and non-menu-choice-permitted-p ;;; Non-menu-choice-permitted-p is true of non-menu-choice if it is not restricted
;;; at its particular level in the current KB's hierarchy.

(defun non-menu-choice-permitted-p (non-menu-choice item)
  (multiple-value-bind (restrictions permitted?)
      (compute-non-menu-restrictions-for-item item)
    (prog1
      (if (memq non-menu-choice restrictions) permitted? (not permitted?))
      (reclaim-filter-list-macro restrictions))))

;; Called from FACILITIES MOVES RUN

;;;; Mapping Over Restrictions

;;; This section implements the functions that actually know how to walk over
;;; the restriction hierarchy.  'Filter-restrictions-for-item' is the meaty
;;; one used to map over the entire hierarchy.

;;; 'Compute-user-restrictions-in-kb-restrictions' used for main menu and
;;; keyboard restrictions were only the kb-restrictions system table needs
;;; to be searched.

;;; 'Filter-restrictions-for-item' takes an item, a list of restriction-kinds,
;;; and a compiled-function.  It maps that function over all restrictions of that
;;; kind.  It searchs, starting with the item, up the KB-Hierarchy through the
;;; kb-restrictions system table and finally up the class hierarchy.  Within each
;;; item encountered it scans the restrictions bottom to top order (as they are
;;; printed).

;;; Usually the return value is (values <list> <flag/boolean>) where the list
;;; is contains either attribute names or choices.  The flag indicates if these
;;; the elements in this list are permited, or not.

;;; "Selecting ... [implies/does] ..." restrictions cause the return value
;;; to look like (values nil nil <choice-or-nil>).

;;; Finally if the mapping function is #'filter-visibility-restrictions the
;;; return value is either IS-VISIBLE, or IS-NOT-VISIBLE. In this case, the fourth
;;; argument is t. (Chestnut did not like the form
;;; (eq function #'filter-visibility-restrictions).

;;; It must be called within the dynamic extent established by with-filters, and
;;; the documentation for that context provides the details of how this works.

;;; This assumes that current-g2-user-mode? is appropriately bound for the
;;; workstation/user in question.  If not in a for-workstation context, then
;;; current-g2-user-mode? should be bound to the value of the g2-user-mode-for-
;;; this-workstation? slot of the workstation in question.

(defun filter-restrictions-for-item (item? keywords function
                                      filter-visibility-restrictions?)
  ;; annotations Check another slot for these restrictions.
  (loop with proprietary? = (if item? (proprietary-p item?))
        with traversing-class-hierarchy? = nil
        with templ
        ;; This iteration on location is not abstracted, therefore similar code is
        ;; found in make-table-describing-restrictions. If you change this
        ;; iteration, change that one also.
        with original-item = (or item? kb-restrictions)
        for location = original-item
                  then (step-up-user-restrictions-hierarchy
                         location
                         traversing-class-hierarchy? original-item)
        until (null location)

until
          (loop for mode-restriction in
                  ;; annotations get (proprietary-restrictions location) ??
                  (if traversing-class-hierarchy?
```

```
(loop with permitted-set = nil
      with prohibited-set = nil
      with absolutely-prohibited-set = nil
      with termination-state? = nil
   for mode-restriction in user-restrictions-in-slot-of-kb-restrictions
      as restricted-mode?
         = (memq current-g2-user-mode? (second mode-restriction))
      do (when (if (eq (first mode-restriction) 'when)    ; "unless" otherwise
                   restricted-mode?
                   (not restricted-mode?))
           (loop for restriction-clause in (cddr mode-restriction)
                as restriction-type = (second restriction-clause)
                as additions = (cddr restriction-clause)
             do (case restriction-type
                  ((include include-additionally)
                   (unless termination-state?
                     (setq permitted-set
                           (compute-new-restriction-set
                              permitted-set additions
                              prohibited-set absolutely-prohibited-set))
                     (if (eq restriction-type 'include)
                         (setq termination-state? 'include))))

((exclude exclude-additionally)
                   (unless termination-state?
                     (setq prohibited-set
                           (compute-new-restriction-set
                              prohibited-set additions
                              permitted-set nil))
                     (if (eq restriction-type 'exclude)
                         (setq termination-state? 'exclude))))

(exclude-absolutely
                    (setq absolutely-prohibited-set
                          (compute-new-restriction-set
                             absolutely-prohibited-set
                             additions nil nil))
                    (setq permitted-set
                          (remove-from-restriction-set
                             permitted-set
                             ;; Was restriction-clause -- a bug with no effect.
                             additions))
                    (setq prohibited-set
                          (compute-new-restriction-set
                             prohibited-set additions
                             nil nil))))))
   finally
      (return
        (case termination-state?
          (include
            (reclaim-filter-list prohibited-set)
            (reclaim-filter-list absolutely-prohibited-set)
            (values permitted-set t))
          (otherwise
            (reclaim-filter-list permitted-set)
            (reclaim-filter-list absolutely-prohibited-set)
            (values prohibited-set nil)))))))
```

What is claimed is:

1. In a computer system comprising an operating environment and an application program and user interface apparatus, an access restriction interface system for limiting user access to the computer system by restricting user input through the user interface apparatus and computer output through the user interface apparatus, said access restriction interface system comprising:

(a) a workspace hierarchy characterized by at least one top-level workspace and at least one lower level workspace on which items may be positioned, said workspaces being related to one another according to a logical workspace tree structure, with said at least one top-level workspace constituting the root of said workspace tree structure and said at least one lower level workspace constituting the branches of said workspace tree structure;

(b) user restrictions selectively assignable to one or more of said workspaces and implemented in said workspace hierarchy so as to apply to the particular workspace to which said restrictions are assigned and to lower level workspaces that are hierarchal branches of the particular workspace to which said workspace restrictions are assigned;

(c) at least one class hierarchy for items and attributes of items positioned in one or more of said workspaces, said class hierarchy being characterized by a base class and one or more lower level classes related to one another according to a class tree structure in which said lower level classes are subclasses of said base class and constitute hierarchal branches of said class tree structure, whereby each item in a class has the attributes of that class and the attributes of all higher level classes; and (d) class restrictions selectively assignable to said base class and said lower level classes, said class restrictions being implemented in said class hierarchy so as to apply to the particular class to which it is assigned and to all hierarchal subclasses of that class.

2. A system according to claim 1 wherein said access restriction interface system further comprises:

(e) a proprietary mode construct characterized by proprietary workspace restrictions selectively assignable to workspaces and adapted to function as a mode filter for rendering a selected workspace inaccessible to all users.

```
                    (class-restrictions location)
                    (user-restrictions location))
          as mode-list = (second mode-restriction)

thereis
            (when (case (first mode-restriction)
                    (when
                      (or
                        (memq current-g2-user-mode? mode-list)
                        ;; annotations Check another slot for these restrictions.
                        (and (memq 'proprietary mode-list)
                             (or proprietary?
                                 (and traversing-class-hierarchy?
                                      (proprietary-p location))))))
                    (otherwise          ; must be unless
                      (and (neq current-g2-user-mode? 'administrator)
                           (not (memq current-g2-user-mode?
                                      mode-list)))))
              (loop for restriction-clause in (cddr mode-restriction)
                    for operation-type = (first restriction-clause)
                    thereis
                      (if (and
                            (memq operation-type keywords)
                            (or
                              (and (null conditional-selected-choice?)
                                   (null conditional-termination-state?))
                              ;; Once the conditional search has
                              ;; completed, only absolutely clauses are
                              ;; examined.
                              (eq operation-type 'selecting-absolutely)
                              (eq 'exclude-absolutely
                                  (case operation-type
                                    ((workspace-menu non-menu)
                                     (third restriction-clause))
                                    ((visibility table)
                                     (fourth restriction-clause))))))
                          (funcall-simple-compiled-function
                            function restriction-clause item?))))
    finally
      (return
        (cond
          (filter-visibility-restrictions?
           conditional-termination-state?)
          (absolutely-selected-choice?
           (reclaim-permitted-restriction-set)
           (reclaim-prohibited-restriction-set)
           (cond
             ((or (memq absolutely-selected-choice?
                        absolutely-prohibited-restriction-set)
                  (eq absolutely-selected-choice? choice-conflict))
              (reclaim-absolutely-prohibited-restriction-set)
              (values nil nil 'nothing))
             (t (reclaim-absolutely-prohibited-restriction-set)
                (values nil nil absolutely-selected-choice?))))
          (conditional-selected-choice?
           (reclaim-permitted-restriction-set)
           (reclaim-prohibited-restriction-set)
           (cond
             ((memq conditional-selected-choice?
                    absolutely-prohibited-restriction-set)
              (reclaim-absolutely-prohibited-restriction-set)
              (values nil nil 'nothing))
             (t (reclaim-absolutely-prohibited-restriction-set)
                (values nil nil conditional-selected-choice?))))
          ((eq conditional-termination-state? 'permitted)
           (reclaim-prohibited-restriction-set)
           (reclaim-absolutely-prohibited-restriction-set)
           (values permitted-restriction-set t))
          (t (reclaim-permitted-restriction-set)
             (reclaim-absolutely-prohibited-restriction-set)
             (values prohibited-restriction-set nil))))
      ))

;; Called by:
;;    compute-menu-restrictions-for-click-on-workspace passing filter-workspace-menu-restriction
;;    include-slot-in-attribute-table-p                passing filter-visibility-restrictions
;;    compute-menu-restrictions-for-click-on-table     passing filter-table-restrictions
;;    compute-non-menu-restrictions-for-item           passing filter-non-menu-restrictions
;; in this module (defun compute-user-restrictions-in-kb-restrictions
       (user-restrictions-in-slot-of-kb-restrictions)
  (cond
    ((eq current-g2-user-mode? 'administrator)
     (values nil nil))
    (t
```

3. A system according to claim 2 wherein said access restriction interface system further comprises:
- (f) an absolutely access restriction construct selectively assignable to any of said user restrictions and said class restrictions so as to render said user restrictions and class restrictions incapable of being reversed.

4. A system according to claim 1 wherein said access restriction interface system further comprises:
- (e) an absolutely access restriction construct selectively assignable to any of said user restrictions and said class restrictions so as to render said user restrictions and class restrictions incapable of being reversed.

5. In a computer system comprising an operating environment and an application program and user interface apparatus, an access restriction interface system for limiting user access to the computer system by restricting user input through the user interface apparatus and computer output through the user interface apparatus, said access restriction interface system comprising:
- (a) a workspace hierarchy characterized by at least one top-level workspace and at least one lower level workspace on which items may be positioned, said workspaces being related to one another according to a logical workspace tree structure, with said at least one top-level workspace constituting the root of said workspace tree structure and said at least one lower level workspace constituting the branches of said workspace tree structure;
- (b) user restrictions selectively assignable to one or more of said workspaces and implemented in said workspace hierarchy so as to apply to the particular workspace to which said restrictions are assigned and to lower level workspaces that are hierarchal branches of the particular workspace to which said workspace restrictions are assigned; and
- (c) a proprietary mode construct characterized by proprietary workspace restrictions selectively assignable to workspaces and adapted to function as a mode filter for rendering a selected workspace inaccessible to all users.

6. A system according to claim 5 wherein said access restriction interface system further comprises:
- (d) an absolutely access restriction construct selectively assignable to any of said user restrictions so as to render said user restrictions incapable of being reversed.

7. In a computer system comprising an operating environment and an application program and user interface apparatus, an access restriction interface system for limiting user access to the computer system by restricting user input through the user interface apparatus and computer output through the user interface apparatus, said access restriction interface system comprising:
- (a) a workspace hierarchy characterized by at least one top-level workspace and at least one lower level workspace on which items may be positioned, said workspaces being related to one another according to a logical workspace tree structure, with said at least one top-level workspace constituting the root of said workspace tree structure and said at least one lower level workspace constituting the branches of said workspace tree structure;
- (b) user restrictions selectively assignable to one or more of said workspaces and implemented in said workspace hierarchy so as to apply to the particular workspace to which said restrictions are assigned and to lower level workspaces that are hierarchal branches of the particular workspace to which said workspace restrictions are assigned; and
- (c) an absolutely access restriction construct selectively assignable to any of said user restrictions so as to render said user restrictions incapable of being reversed.

8. In a computer system comprising an operating environment and an application program and user interface apparatus, an access restriction interface system for limiting user access to the computer system by restricting user input through the user interface apparatus and computer output through the user interface apparatus, said access restriction interface system comprising:
- (a) means for establishing a workspace hierarchy characterized by at least one top-level workspace and at least one lower level workspace on which items may be positioned, said workspaces being related to one another according to a logical workspace tree structure, with said at least one top-level workspace constituting the root of said workspace tree structure and said at least one lower level workspace constituting the branches of said workspace tree structure;
- (b) means for establishing user restrictions selectively assignable to one or more of said workspaces and implemented in said workspace hierarchy so as to apply to the particular workspace to which said restrictions are assigned and to lower level workspaces that are hierarchal branches of the particular workspace to which said workspace restrictions are assigned;
- (c) means for establishing at least one class hierarchy for items and attributes of items positioned in one or more of said workspaces, said class hierarchy being characterized by a base class and one or more lower level classes related to one another according to a class tree structure in which said lower level classes are subclasses of said base class and constitute hierarchal branches of said class tree structure, whereby each item in a class has the attributes of that class and the attributes of all higher level classes; and
- (d) means for establishing class restrictions selectively assignable to said base class and said lower level classes, said class restrictions being implemented in said class hierarchy so as to apply to the particular class to which it is assigned and to all hierarchal subclasses of that class.

9. A system according to claim 8 wherein said access restriction interface system further comprises:
- (e) means for establishing a proprietary mode construct characterized by proprietary workspace restrictions selectively assignable to workspaces and adapted to function as a mode filter for rendering a selected workspace inaccessible to all users.

10. A system according to claim 9 wherein said access restriction interface system further comprises:
- (f) means for establishing an absolutely access restriction construct selectively assignable to any of said user restrictions and said class restrictions so as to render said user restrictions and class restrictions incapable of being reversed.

11. A system according to claim 8 wherein said access restriction interface system further comprises:
- (e) means for establishing an absolutely access restriction construct selectively assignable to any of said user restrictions and said class restrictions so as to render said user restrictions and class restrictions incapable to being reversed.

12. In a computer system comprising an operating environment and an application program and user interface apparatus, an access restriction interface system for limiting user access to the computer system by restricting user input through the user interface apparatus and computer output through the user interface apparatus, said access restriction interface system comprising:

(a) means for establishing a workspace hierarchy characterized by at least one top-level workspace and at least one lower level workspace on which items may be positioned, said workspaces being related to one another according to a logical workspace tree structure, with said at least one top-level workspace constituting the root of said workspace tree structure and said at least one lower level workspace constituting the branches of said workspace tree structure;

(b) means for establishing user restrictions selectively assignable to one or more of said workspaces and implemented in said workspace hierarchy so as to apply to the particular workspace to which said restrictions are assigned and to lower level workspaces that are hierarchal branches of the particular workspace to which said workspace restrictions are assigned; and (c) means for establishing a proprietary mode construct characterized by proprietary workspace restrictions selectively assignable to workspaces and adapted to function as a mode filter for rendering a selected workspace inaccessible to all users.

13. A system according to claim 12 wherein said access restriction interface system further comprises:

(d) means for establishing an absolutely access restriction construct selectively assignable to any of said user restrictions so as to render said user restrictions incapable of being reversed.

14. In a computer system comprising an operating environment and an application program and user interface apparatus, an access restriction interface system for limiting user access to the computer system by restricting user input through the user interface apparatus and computer output through the user interface apparatus, said access restriction interface system comprising:

(a) means for establishing a workspace hierarchy characterized by at least one top-level workspace and at least one lower level workspace on which items may be positioned, said workspaces being related to one another according to a logical workspace tree structure, with said at least one top-level workspace constituting the root of said workspace tree structure and said at least one lower level workspace constituting the branches of said workspace tree structure;

(b) means for establishing user restrictions selectively assignable to one or more of said workspaces and implemented in said workspace hierarchy so as to apply to the particular workspace to which said restrictions are assigned and to lower level workspaces that are hierarchal branches of the particular workspace to which said workspace restrictions are assigned; and (c) means for establishing an absolutely access restriction construct selectively assignable too any of said user restrictions so as to render said user restrictions incapable of being reversed.

15. (Amended) A computer-implemented method for operating a computer system of the sort comprising a computer system having an operating environment and an application program and user interface apparatus, and an access restriction interface system for limiting user access to the computer system by restricting user input through the user interface apparatus and computer output through the user interface .apparatus, said method comprising the steps of:

(1) providing:

(a) a workspace hierarchy characterized by at least one top-level workspace and at least one lower level workspace on which items may be positioned, said workspaces being related to one another according to a logical workspace tree structure, with said at least one top-level workspace constituting the root of said workspace tree structure and said at least one lower level workspace constituting the branches of said workspace tree structure;

(b) user restrictions selectively assignable to one or more of said workspaces and implemented in said workspace hierarchy so as to apply to the particular workspace to which said restrictions are assigned and to lower level workspaces that are hierarchal branches of the particular workspace to which said workspace restrictions are assigned;

(c) at least one class hierarchy for items and attributes of items positioned in one or more of said workspaces, said class hierarchy being characterized by a base class and one or more lower level classes related to one another according to a class tree structure in which said lower level classes are subclasses of said base class and constitute hierarchal branches of said class tree structure, whereby each item in a class has the attributes of that class and the attributes of all higher level classes; and (d) class restrictions selectively assignable to said base class and said lower level classes, said class restrictions being implemented in said class hierarchy so as to apply to the particular class to which it is assigned and to all hierarchal subclasses for that class; and (2) creating a plurality of user restrictions assigned to one or more of said workspaces, and creating a plurality of class restrictions assigned to one or more of said classes, so as to establish an access restriction interface system for said computer system.

* * * * *